US012200225B2

(12) United States Patent
Wang

(10) Patent No.: US 12,200,225 B2
(45) Date of Patent: Jan. 14, 2025

(54) SIGNALING SIZE AND POSITION OF TARGET PICTURE-IN-PICTURE REGION

(71) Applicant: Lemon Inc., Grand Cayman (KY)

(72) Inventor: Ye-kui Wang, San Diego, CA (US)

(73) Assignee: Lemon Inc.

( * ) Notice: Subject to any disclaimer, the term of this patent is extended or adjusted under 35 U.S.C. 154(b) by 167 days.

(21) Appl. No.: 17/809,206

(22) Filed: Jun. 27, 2022

(65) Prior Publication Data

US 2023/0019913 A1 Jan. 19, 2023

Related U.S. Application Data

(60) Provisional application No. 63/217,665, filed on Jul. 1, 2021, provisional application No. 63/216,975, filed on Jun. 30, 2021.

(51) Int. Cl.
 *H04N 21/44* (2011.01)
 *H04N 7/01* (2006.01)
 (Continued)

(52) U.S. Cl.
 CPC ............ *H04N 19/167* (2014.11); *H04N 7/01* (2013.01); *H04N 19/132* (2014.11); *H04N 19/136* (2014.11); *H04N 19/172* (2014.11); *H04N 19/188* (2014.11); *H04N 19/30* (2014.11); *H04N 19/46* (2014.11); *H04N 21/44016* (2013.01); *H04N 21/8453* (2013.01)

(58) Field of Classification Search
None
See application file for complete search history.

(56) References Cited

U.S. PATENT DOCUMENTS

2013/0113996 A1* 5/2013 Zhu .................... H04N 21/8543
 348/565
2015/0012956 A1* 1/2015 Kim .................... H04N 21/8586
 725/110

(Continued)

FOREIGN PATENT DOCUMENTS

CA 3057924 A1 * 4/2021
CN 103299616 A 9/2013

(Continued)

OTHER PUBLICATIONS

Foreign Communication From A Related Counterpart Application, Indian Application No. 202224037714, Indian Office Action dated Feb. 27, 2023, 6 pages.

(Continued)

*Primary Examiner* — William J Kim
(74) *Attorney, Agent, or Firm* — Conley Rose, P.C.

(57) ABSTRACT

A method of processing media data. The method includes determining, for a conversion between the media data and a media data file, whether a size and a position of a target picture-in-picture region in a main video are present in the media data file, wherein a supplementary video appears to be overlaid on the target picture-in-picture region when the main video is displayed; and performing the conversion between the media data and the media data file based on the size and the position determined. A corresponding video coding apparatus and non-transitory computer-readable recording medium are also disclosed.

19 Claims, 11 Drawing Sheets

(51) Int. Cl.
*H04N 19/132* (2014.01)
*H04N 19/136* (2014.01)
*H04N 19/167* (2014.01)
*H04N 19/169* (2014.01)
*H04N 19/172* (2014.01)
*H04N 19/30* (2014.01)
*H04N 19/46* (2014.01)
*H04N 21/845* (2011.01)

(56) References Cited

U.S. PATENT DOCUMENTS

| | | | |
|---|---|---|---|
| 2017/0347026 | A1 | 11/2017 | Hannuksela |
| 2019/0306519 | A1 | 10/2019 | Chen |
| 2019/0334619 | A1 | 10/2019 | Aoyama |
| 2019/0379884 | A1 | 12/2019 | Oh |
| 2020/0107008 | A1 | 4/2020 | Hur |
| 2021/0160474 | A1* | 5/2021 | Kim ............... H04N 13/194 |
| 2021/0185411 | A1 | 6/2021 | Franck et al. |
| 2022/0353539 | A1 | 11/2022 | Huang |
| 2023/0108426 | A1* | 4/2023 | Sodagar ............... H04L 65/764 |

FOREIGN PATENT DOCUMENTS

| | | |
|---|---|---|
| CN | 107710768 A | 2/2018 |
| CN | 109691103 A | 4/2019 |
| CN | 109804635 A | 5/2019 |
| CN | 109074678 B | 2/2021 |
| JP | 2007104615 A | 4/2007 |
| JP | 2021505069 A | 2/2021 |
| WO | 2017090457 A1 | 6/2017 |
| WO | 2018069357 A1 | 4/2018 |
| WO | 2020205757 A1 | 10/2020 |

OTHER PUBLICATIONS

Non-Final Office Action from U.S. Appl. No. 17/809,199 dated Aug. 17, 2023.
"Information technology—High efficiency coding and media delivery in heterogeneous environments—Part 2: High Efficiency Video Coding," ISO/IEC JTC 1/SC 29/WG 11 N17661, ISO/IEC DIS 23008-2:201x, Apr. 20, 2018, 8 pages.
Document: JVET-G1001, v1, Chen J., et al., "Algorithm description of Joint Exploration Test Model 7 (JEM7)," Joint Video Experts Team (JVET) of ITU-T SG 16 WP 3 and ISO/IEC JTC 1/SC 29/WG 11, 7th Meeting: Torino, IT, Jul. 13-21, 2017, 48 pages.
"Information technology—Coded representation of immersive media—Part 3: Versatile video coding," ISO/IEC JTC 1/SC 29/WG 11 N18692, ISO/IEC CD 23090-3, Jul. 12, 2019, 445 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11, 19th Meeting: by teleconference, Jun. 22-Jul. 1, 2020, 548 pages.
Series H: Audiovisual and Multimedia Systems Infrastructure of audiovisual services—Coding of moving video; Versatile supplemental enhancement information messages for coded video bitstreams, Recommendation ITU-T Rec. H.274, ISO/IEC 23002-7, Aug. 2020, 86 pages.
Document: JVET-S2007-v1, Boyce, J., et al., "Supplemental enhancement information for coded video bitstreams (Draft 5)," Joint Video Experts Team (JVET) of ITU-T SG 16 WP 3 and ISO/IEC JTC 1/SC 29/WG 11, 189th Meeting: by teleconference, Apr. 15/24, 2020, 83 pages.
Qualcomm Incorporated, "Editor's Version of Dash Is 4th Edition," ISO/IEC 23009-1: International Organisation for Standardisation Organisation Internationale De Normalisation; ISO/IEC JTC1/SC29/WG11; Coding of Moving Pictures and Audio; ISO/IEC JTC1/SC29/WG11 MPEG2019/m52458 Jan. 2020, 287 pages.
"Information technology—Coding of audio-visual objects—Part 15: Carriage of network abstraction layer (NAL) unit structured video in the ISO base media file format" ISO/IEC FDIS 14496-15:2014(E), Jan. 13, 2014, 198 pages.
"Potential improvements on Carriage of VVC and EVC in ISOBMFF", ISO/IEC JTC 1/SC 29/WG 03 output document N0035, Nov. 13, 2020, 66 pages.
"Information technology—High efficiency coding and media delivery in heterogeneous environments—Part 12: Image File Format—Amendment 2: Support for VVC, EVC, slideshows and other improvements", ISO/IEC 23008-12:2017 CDAM 2: 2020(E) JTC 1/SC 29/WG 03 output document N0038, Oct. 26, 2020, 30 pages.
Foreign Communication From A Related Counterpart Application, Indian Application No. 202224037713, Indian Office Action dated Feb. 6, 2023, 7 pages.
Drugeon, V., "TM-AVC1221r1_Guidelines for personalization and accessibility with VVC" Digital Video Broadcasting, Panasonic Business Support Europe GMBH, XP017861790, Jun. 10, 2021, 6 pages.
Systems Subgroup "Technologies under Consideration for Dynamic Adaptive Streaming over HTTP 23009, Parts 1, 3, 4, 5 and 6," Revised TuC Draft, ISO/IEC JTC1/SC29/WG11 MPEG2018/N17XXX, Apr. 2018, 87 pages.
Wang, Y-K., et al., "The High-Level Syntax of the Versatile Video Coding (VVC) Standard," IEEE Transactions on Circuits and Systems for Video Technology, vol. 31, No. 10, Oct. 2021, 22 pages.
Foreign Communication From A Related Counterpart Application, European Application No. 22182327.1, European Office Action dated Nov. 4, 2022, 12 pages.
Chinese Notice of Allowance from Chinese Patent Application No. 202210771043.4 dated Aug. 28, 2024, 15 pages.

* cited by examiner

SIGNALING SIZE AND POSITION OF TARGET PICTURE-IN-PICTURE REGION

CROSS-REFERENCE TO RELATED APPLICATIONS

This patent application claims the benefit of U.S. Provisional Patent Application No. 63/216,975 filed Jun. 30, 2021, by Lemon, Inc., and titled "Support of Picture-in-Picture Services in DASH," and U.S. Provisional Patent Application No. 63/217,665 filed Jul. 1, 2021, by Lemon, Inc., and titled "Support of Picture-in-Picture Services in DASH," each of which is hereby incorporated by reference.

TECHNICAL FIELD

The present disclosure is generally related to video streaming and, in particular, to the support of picture-in-picture services in Dynamic Adaptive Streaming over Hypertext Transfer Protocol (DASH).

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques that indicate a size and position of a target picture-in-picture region. Thus, the video coding process is improved relative to conventional video coding techniques.

A first aspect relates to a method of processing media data. The method includes determining, for a conversion between the media data and a media data file, whether a size and a position of a target picture-in-picture region in a main video are present in the media data file, wherein a supplementary video appears to be overlaid on the target picture-in-picture region when the main video is displayed; and performing the conversion between the media data and the media data file based on the size and the position determined.

Optionally, in any of the preceding aspects, another implementation of the aspect provides that a size of the supplementary video is smaller than the size of the main video.

Optionally, in any of the preceding aspects, another implementation of the aspect provides that the size and the position of the target picture-in-picture region in the main video are designated by x, y, width, and height when the size and the position are present in the media data file, where x and y specify a top-left corner of the target picture-in-picture region in luma samples, and where the width and the height specify the width and height of the target picture-in-picture region in the luma samples.

Optionally, in any of the preceding aspects, another implementation of the aspect provides that one or more of the size and the position of the target picture-in-picture region in the main video is indicated by an element or an attribute of a preselection element when the size and the position are present in the media data file.

Optionally, in any of the preceding aspects, another implementation of the aspect provides that one or more of the size and the position of the target picture-in-picture region in the main video is indicated by an element or an attribute of a main adaptation set of a preselection element when the size and the position are present in the media data file.

Optionally, in any of the preceding aspects, another implementation of the aspect provides that the size and the position specify an exact location of the target picture-in-picture region in the main video when the size and the position are present in the media data file and when an @dataUnitsReplaceable attribute is true.

Optionally, in any of the preceding aspects, another implementation of the aspect provides that the size and the position specify a suggested location of the target picture-in-picture region in the main video when the size and the position are present in the media data file and when an @dataUnitsReplaceable attribute is false.

Optionally, in any of the preceding aspects, another implementation of the aspect provides that the media data file provides no recommendation for a location of the target picture-in-picture region in the main video when the size and the position are not present in the media data file and when an @dataUnitsReplaceable attribute is false.

Optionally, in any of the preceding aspects, another implementation of the aspect provides that the media data file includes a preselection element that includes a Picinpic element, and wherein the Picinpic element includes all or none of an @x attribute, an @y attribute, an @width attribute, and an @height attribute.

Optionally, in any of the preceding aspects, another implementation of the aspect provides that the media data file includes a preselection element that includes a Picinpic element, wherein the Picinpic element includes an @x attribute and an @y attribute, wherein the @x attribute specifies a horizontal position of a top-left encoded video sample of the target picture-in-picture region, and wherein the @y attribute specifies a vertical position of the top-left encoded video sample of the target picture-in-picture region.

Optionally, in any of the preceding aspects, another implementation of the aspect provides that the media data file includes a preselection element that includes a Picinpic element, and wherein the Picinpic element includes an @width attribute and an @height attribute, wherein the @width attribute specifies a width of the target picture-in-picture region, and wherein the @height attribute specifies a height of the target picture-in-picture region.

Optionally, in any of the preceding aspects, another implementation of the aspect provides that the media data file includes a preselection element that includes a Picinpic element, and wherein the Picinpic element includes a region element.

Optionally, in any of the preceding aspects, another implementation of the aspect provides that the media data file includes a preselection element that includes a Picinpic element, wherein the Picinpic element includes a region element, wherein the region element includes an @x attribute and an @y attribute, wherein the @x attribute specifies a horizontal position of a top-left encoded video sample of the target picture-in-picture region, and wherein the @y attribute specifies a vertical position of the top-left encoded video sample of the target picture-in-picture region.

Optionally, in any of the preceding aspects, another implementation of the aspect provides that the media data file includes a preselection element that includes a Picinpic element, wherein the Picinpic element includes a region element, wherein the region element includes an @width attribute and an @height attribute, wherein the @width attribute specifies a width of the target picture-in-picture region, and wherein the @height attribute specifies a height of the target picture-in-picture region.

Optionally, in any of the preceding aspects, another implementation of the aspect provides that the size and the position are disposed in a Media Presentation Description (MPD) file.

Optionally, in any of the preceding aspects, another implementation of the aspect provides that the size and the position are disposed in a Dynamic Adaptive Streaming over Hypertext Transfer Protocol (DASH) preselection element.

Optionally, in any of the preceding aspects, another implementation of the aspect provides that the conversion includes encoding the media data into a bitstream.

Optionally, in any of the preceding aspects, another implementation of the aspect provides that the conversion includes decoding the media data from a bitstream.

An apparatus for processing video data comprising a processor and a non-transitory memory with instructions thereon, wherein the instructions upon execution by the processor, cause the processor to: determine, for a conversion between the media data and a media data file, whether a size and a position of a target picture-in-picture region in a main video are present in the media data file, wherein a supplementary video appears to be overlaid on the target picture-in-picture region when the main video is displayed; and perform the conversion between the media data and the media data file based on the size and the position determined.

A non-transitory computer-readable recording medium storing a Media Presentation Description (MPD) of a video which is generated by a method performed by a video processing apparatus, wherein the method comprises: determining that a preselection element includes an indicator, wherein the indicator indicates which video data units of a main video represent a target picture-in-picture region; and generating the MPD based on the indicator.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
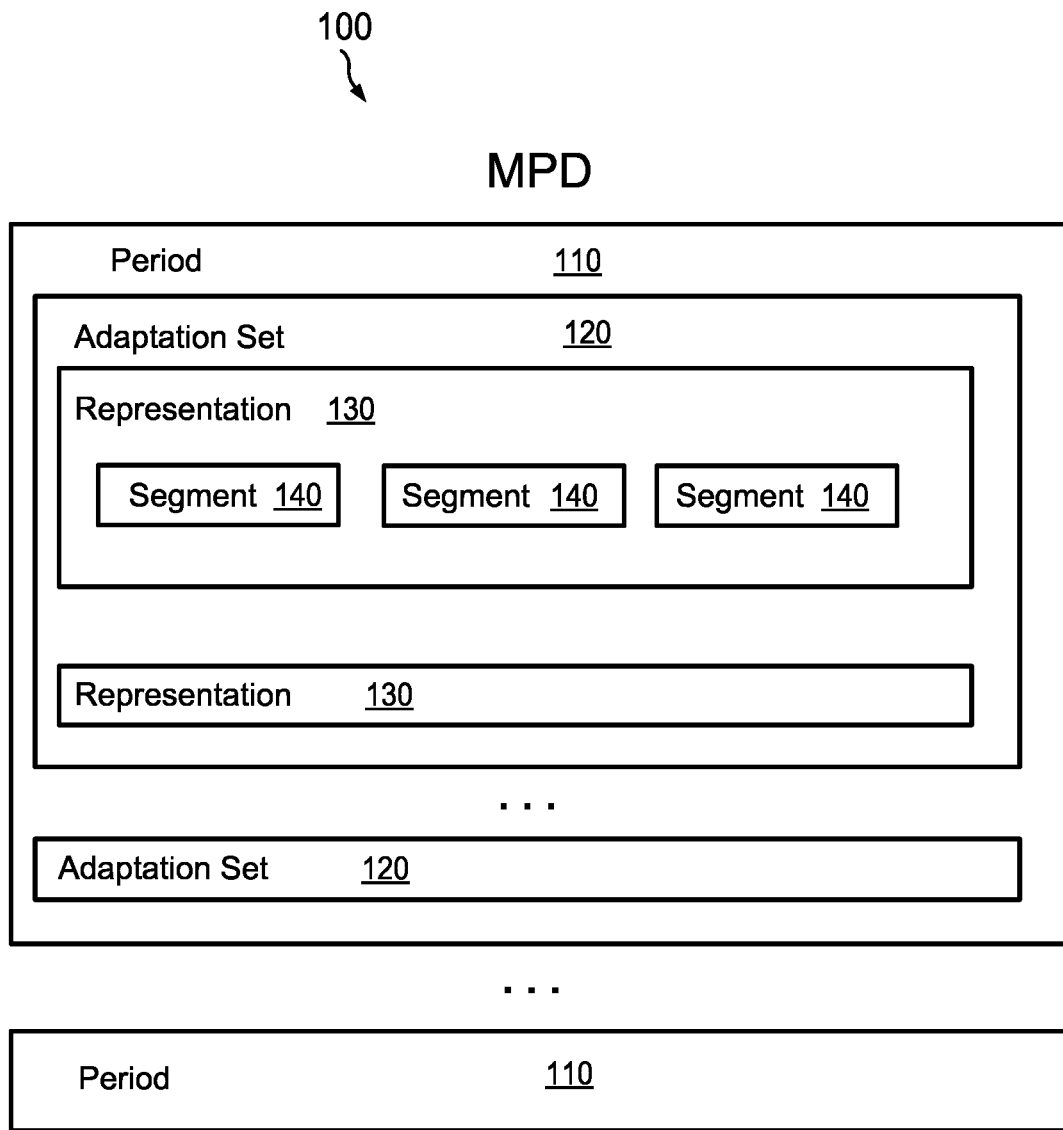
FIG. 1 is a schematic diagram illustrating a description of a video by a media presentation description (MPD) used in DASH.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

H.266 terminology is used in some description only for ease of understanding and not for limiting scope of the disclosed techniques. As such, the techniques described herein are applicable to other video codec protocols and designs also.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting at fifty percent (50%) bitrate reduction compared to HEVC. VVC version 1 was finalized in July 2020.

The VVC standard (ITU-T H.266|ISO/IEC 23090-3) and the associated Versatile Supplemental Enhancement Information (VSEI) standard (ITU-T H.274|ISO/IEC 23002-7) were designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive three hundred sixty degree (360°) immersive media.

The Essential Video Coding (EVC) standard (ISO/IEC 23094-1) is another video coding standard that has recently been developed by MPEG.

Media streaming applications are typically based on the Internet Protocol (IP), Transmission Control Protocol (TCP), and Hypertext Transfer Protocol (HTTP) transport methods, and typically rely on a file format such as the ISO base media file format (ISOBMFF). One such streaming system is DASH. For using a video format with ISOBMFF and DASH, a file format specification specific to the video format, such as the AVC file format and the HEVC file format in ISO/IEC 14496-15: "Information technology—Coding of audio-visual objects—Part 15: Carriage of network abstraction layer (NAL) unit structured video in the ISO base media file format," would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format in ISO/IEC 23008-12: "Information technology—High efficiency coding and media delivery in heterogeneous environments—Part 12: Image File Format," would be needed.

The VVC video file format, the file format for storage of VVC video content based on ISOBMFF, is currently being developed by MPEG. The latest draft specification of the VVC video file format is included in ISO/IEC JTC 1/SC 29/WG 03 output document N0035, "Potential improvements on Carriage of VVC and EVC in ISOBMFF," November 2020.

The VVC image file format, the file format for storage of image content coded using VVC based on ISOBMFF, is currently being developed by MPEG. The latest draft specification of the VVC image file format is included in ISO/IEC JTC 1/SC 29/WG 03 output document N0038, "Information technology—High efficiency coding and media delivery in heterogeneous environments—Part 12: Image File Format—Amendment 3: Support for VVC, EVC, slideshows and other improvements (CD stage)," November 2020.

FIG. 1 is a schematic diagram illustrating a description of a video or media data by an MPD 100 used in DASH. The MPD 100 describes media streams in terms of periods 110, adaptation sets 120, representations 130, and segments 140.

In DASH, there may be multiple representations for video and/or audio data of multimedia content, and different representations may correspond to different coding characteristics (e.g., different profiles or levels of a video coding standard, different bitrates, different spatial resolutions, etc.). The manifest of such representations may be defined in an MPD data structure. A media presentation may correspond to a structured collection of data that is accessible to a DASH streaming client device (e.g., smart phone, electronic tablet, laptop, etc.). The DASH streaming client device may request and download media data information to present a streaming service to a user of the client device. A media presentation may be described in the MPD data structure, which may include updates of the MPD.

A media presentation may contain a sequence of one or more periods 110. Each period 110 may extend until the start of the next period 110, or until the end of the media presentation, in the case of the last period 110. Each period 110 may contain one or more representations 130 for the same media content. A representation 130 may be one of a number of alternative encoded versions of audio, video, timed text, or other such data. The representations 130 may differ by encoding types, e.g., by bitrate, resolution, and/or codec for video data and bitrate, language, and/or codec for audio data. The term representation 130 may be used to refer to a section of encoded audio or video data corresponding to a particular period 110 of the multimedia content and encoded in a particular way.

Representations 130 of a particular period 110 may be assigned to a group indicated by an attribute in the MPD 100 indicative of an adaptation set 120 to which the representations 130 belong. Representations 130 in the same adaptation set 120 are generally considered alternatives to each other, in that a client device can dynamically and seamlessly switch between these representations 130, e.g., to perform bandwidth adaptation. For example, each representation 130 of video data for a particular period may be assigned to the same adaptation set 120, such that any of the representations 130 may be selected for decoding to present media data, such as video data or audio data, of the multimedia content for the corresponding period 110. The media content within one period 110 may be represented by either one representation 130 from group 0, if present, or the combination of at most one representation from each non-zero group, in some examples. Timing data for each representation 130 of a period 110 may be expressed relative to the start time of the period 110.

A representation 130 may include one or more segments 140. Each representation 130 may include an initialization segment 140, or each segment 140 of a representation may be self-initializing. When present, the initialization segment 140 may contain initialization information for accessing the representation 130. In general, the initialization segment 140 does not contain media data. A segment 140 may be uniquely referenced by an identifier, such as a uniform resource locator (URL), uniform resource name (URN), or uniform resource identifier (URI). The MPD 100 may provide the identifiers for each segment 140. In some examples, the MPD 100 may also provide byte ranges in the form of a range attribute, which may correspond to the data for a segment 140 within a file accessible by the URL, URN, or URI.

Different representations 130 may be selected for substantially simultaneous retrieval for different types of media data. For example, a client device may select an audio representation 130, a video representation 130, and a timed text representation 130 from which to retrieve segments 140. In some examples, the client device may select particular adaptation sets 120 for performing bandwidth adaptation. That is, the client device may select an adaptation set 120 including video representations 130, an adaptation set 120 including audio representations 130, and/or an adaptation set 120 including timed text. Alternatively, the client device may select adaptation sets 120 for certain types of media (e.g., video), and directly select representations 130 for other types of media (e.g., audio and/or timed text).

A typical DASH streaming procedure is shown by the following steps.

First, the client gets the MPD. In an embodiment, the client device receives the MPD from a content source after the client device has requested the MPD.

Second, the client estimates the downlink bandwidth and selects a video representation 130 and an audio representation 130 according to the estimated downlink bandwidth and the codec, decoding capability, display size, audio language setting, etc.

Third, unless the end of the media presentation is reached, the client requests media segments 140 of the selected representations 130 and presents the streaming content to the user.

Fourth, the client keeps estimating the downlink bandwidth. When the bandwidth changes significantly (e.g., becomes lower), the client selects a different video representation 130 to match the newly estimated bandwidth, and the procedure returns to the third step.

In VVC, a picture is divided (e.g., partitioned) into one or more tile rows and one or more tile columns. A tile is a sequence of coding tree units (CTUs) that cover a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 2:
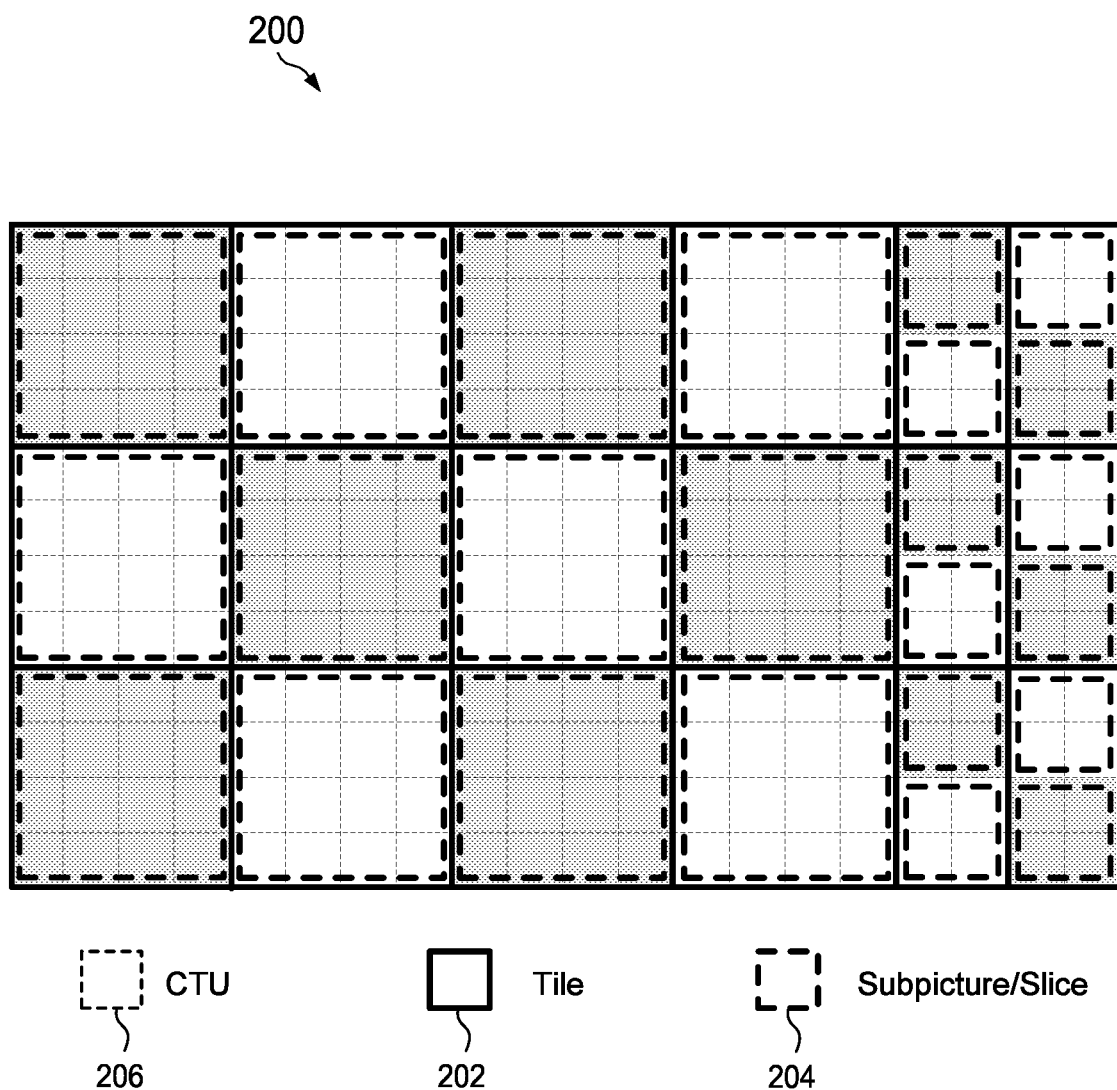
FIG. 2 is an example of a picture partitioned into tiles, slices, and subpictures.

FIG. 2 is an example of a picture 200 partitioned into tiles 202, subpictures/slices 204, and CTUs 206. As shown, the picture 200 has been partitioned into eighteen tiles 202 and twenty-four subpictures/slices 204. In VVC, each subpicture consists of one or more complete rectangular slices that collectively cover a rectangular region of the picture as shown in FIG. 2. A subpicture may be either specified to be extractable (i.e., coded independently of other subpictures of the same picture and of earlier pictures in decoding order) or not extractable. Regardless of whether a subpicture is extractable or not, the encoder can control whether in-loop filtering (including deblocking, Sample Adaptive Offset (SAO), and adaptive loop filter (ALF)) is applied across the subpicture boundaries individually for each subpicture.

Functionally, subpictures are similar to the motion-constrained tile sets (MCTSs) in HEVC. They both allow independent coding and extraction of a rectangular subset of a sequence of coded pictures for use cases like viewport-dependent 360° video streaming optimization and region of interest (ROI) applications.

In streaming of 360° video (a.k.a., omnidirectional video), at any particular moment only a subset (e.g., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the user at any given moment. Splitting the high-quality representation of the entire omnidirectional video into subpictures at an appropriate granularity enables such an optimization as shown in FIG. 2 with twelve high-resolution subpictures on the left-hand side and the remaining twelve subpictures of the omnidirectional video in lower resolution on the right-hand side.

Figure 3:
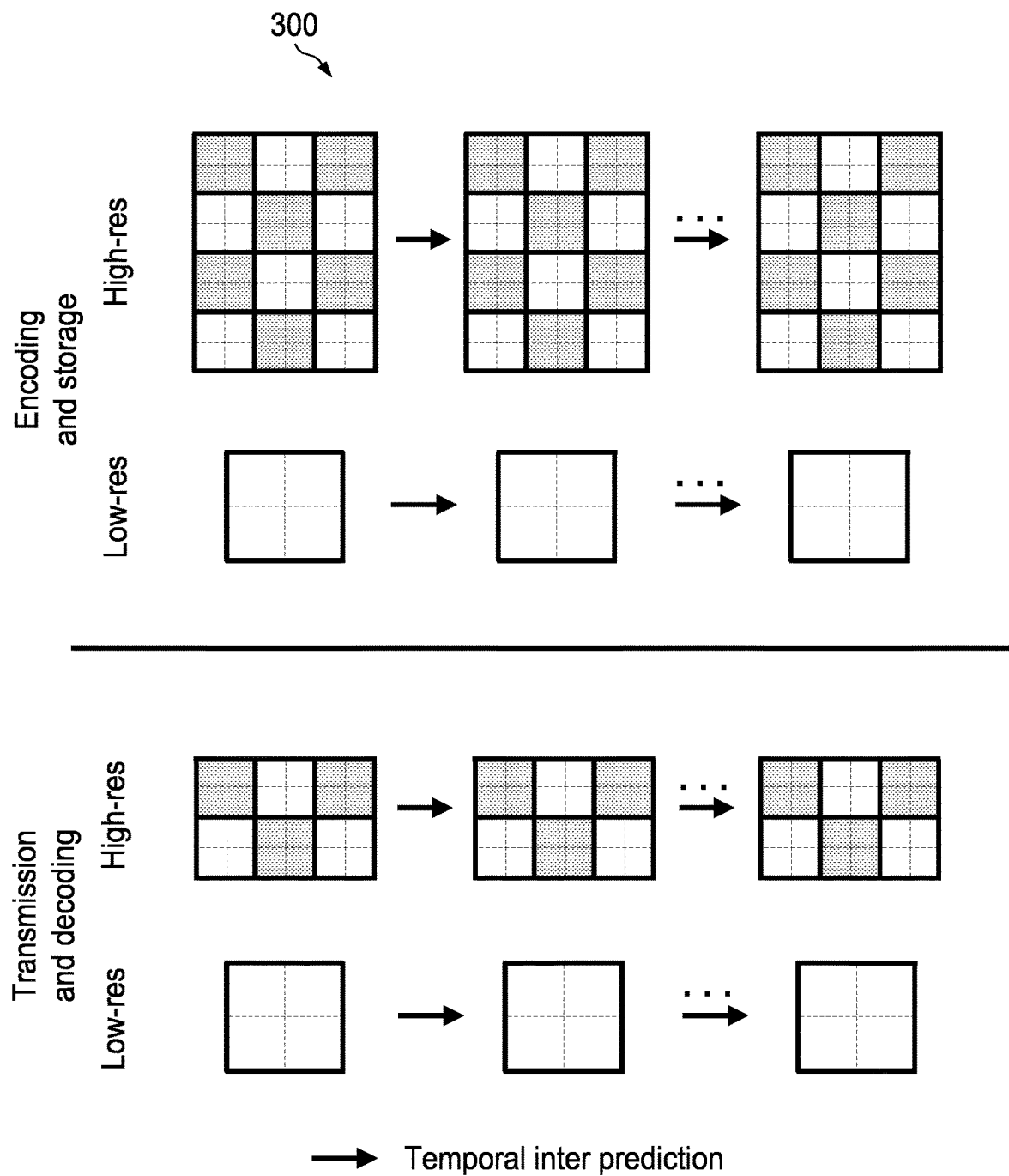
FIG. 3 is an example of a subpicture-based viewport-dependent 360° video delivery scheme.

FIG. 3 is an example of a subpicture-based viewport-dependent 360° video delivery scheme 300. As shown in FIG. 3, only a higher-resolution representation of the full video uses subpictures. A lower-resolution representation of the full video does not use subpictures and can be coded with less frequent random access points (RAPs) than the higher-resolution representation. The client receives the full video in the lower-resolution while for the higher-resolution video, the client only receives and decodes the subpictures that cover the current viewport.

There are several design differences between subpictures and MCTSs. First, the subpictures feature in VVC allows motion vectors of a coding block to point outside of the subpicture, even when the subpicture is extractable. To do so, the subpictures feature applies sample padding at subpicture boundaries which, in this case, are similar to picture boundaries. Second, additional changes were introduced for the selection and derivation of motion vectors in the merge mode and in the decoder side motion vector refinement process of VVC. This allows higher coding efficiency compared to the non-normative motion constraints applied at the encoder-side for MCTSs. Third, rewriting the slice headers (SHs) (and picture header (PH) network abstraction layer (NAL) units, when present) is not needed when extracting one or more extractable subpictures from a sequence of pictures to create a sub-bitstream that is a conforming bitstream. In sub-bitstream extractions based on HEVC MCTSs, rewriting of SHs is needed. Note that in both HEVC MCTSs extraction and VVC subpictures extraction, rewriting of sequence parameter sets (SPSs) and picture parameter sets (PPSs) is needed. However, typically there are only a few parameter sets in a bitstream, while each picture has at least one slice. Therefore, the rewriting of SHs can be a significant burden for application systems. Fourth, slices of different subpictures within a picture are allowed to have different NAL unit types. This is the feature often referred to as mixed NAL unit types or mixed subpicture types within a picture, discussed in more detail below. Fifth, VVC specifies hypothetical reference decoder (HRD) and level definitions for subpicture sequences, thus the conformance of the sub-bitstream of each extractable subpicture sequence can be ensured by encoders.

In AVC and HEVC, all VCL NAL units in a picture need to have the same NAL unit type. VVC introduces the option to mix subpictures with certain different VCL NAL unit types within a picture, thus providing support for random access not only at the picture level but also at the subpicture level. In VVC, VCL NAL units within a subpicture still need to have the same NAL unit type.

The capability of random accessing from Intra Random Access Pictures (IRAP) subpictures is beneficial for 360° video applications. In viewport-dependent 360° video delivery schemes similar to the one shown in FIG. 3, the content of spatially neighboring viewports largely overlaps, i.e. only a fraction of subpictures in a viewport is replaced by new subpictures during a viewport orientation change, while most subpictures remain in the viewport. Subpicture sequences that are newly introduced into the viewport must begin with IRAP slices, but significant reduction in overall transmission bit rate can be achieved when the remaining subpictures are allowed to carry out inter-prediction at viewport changes.

The indication of whether a picture contains just a single type of NAL units or more than one type is provided in the PPS referred to by the picture (i.e., using a flag called pps_mixed_nalu_types_in_pic_flag). A picture may comprise subpictures containing IRAP slices and subpictures containing trailing slices at the same time. A few other combinations of different NAL unit types within a picture are also allowed, including leading picture slices of NAL unit types Random Access Skipped Leading (RASL) and Random Access Decodable Leading (RADL), which allows the merging of subpicture sequences with open-group of pictures (GOP) and close-GOP coding structures extracted from different bitstreams into one bitstream.

The layout of subpictures in VVC is signaled in the SPS, thus constant within a coded layer video sequence (CLVS). Each subpicture is signaled by the position of its top-left CTU and its width and height in number of CTUs, therefore ensuring that a subpicture covers a rectangular region of the picture with CTU granularity. The order in which the subpictures are signaled in the SPS determines the index of each subpicture within the picture.

For enabling extraction and merging of subpicture sequences without rewriting of SHs or PHs, the slice addressing scheme in VVC is based on subpicture IDs and a subpicture-specific slice index to associate slices to subpictures. In the slice header (SH), the subpicture identifier (ID) of the subpicture containing the slice and the subpicture-level slice index are signaled. Note that the value of the subpicture ID of a particular subpicture can be different from the value of its subpicture index. A mapping between the two is either signaled in the SPS or PPS (but never both) or implicitly inferred. When present, the subpicture ID mapping needs to be rewritten or added when rewriting the SPSs and PPSs during the subpicture sub-bitstream extraction process. The subpicture ID and the subpicture-level slice index together indicate to the decoder the exact position of the first decoded CTU of a slice within the decoded picture buffer (DPB) slot of the decoded picture. After sub-bitstream extraction, the subpicture ID of a subpicture remains unchanged while the subpicture index may change. Even when the raster-scan CTU address of the first CTU in a slice in the subpicture has changed compared to the value in the original bitstream, the unchanged values of subpicture ID and subpicture-level slice index in the respective SH would still correctly determine the position of each CTU in the decoded picture of the extracted sub-bitstream.

Figure 4:
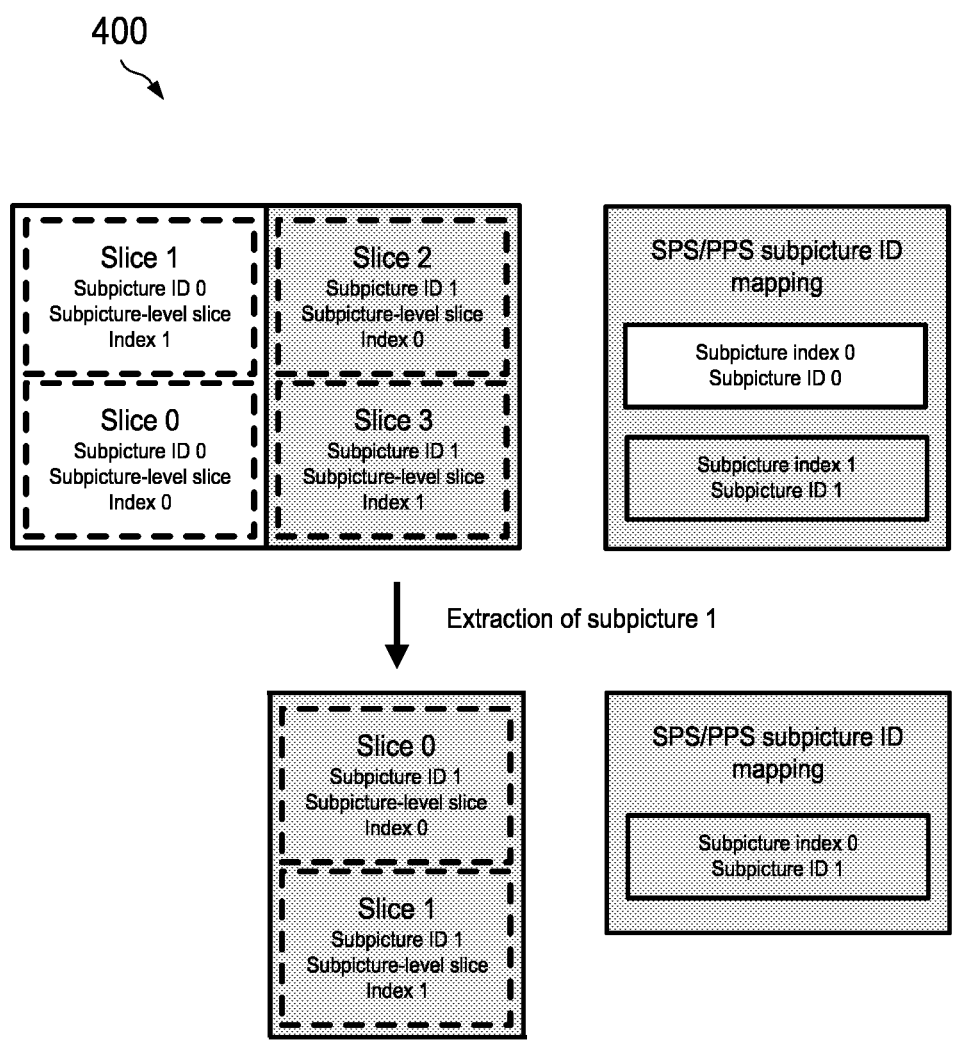
FIG. 4 is an example of subpicture extraction.

FIG. 4 is an example of subpicture extraction 400. In particular, FIG. 4 illustrates the usage of a subpicture ID, a subpicture index, and a subpicture-level slice index to enable the subpicture extraction 400. In the illustrated embodiment, the subpicture extraction 400 contains two subpictures and four slices.

Similar to subpicture extraction 400, the signaling for subpictures allows merging several subpictures from different bitstreams into a single bitstream by only rewriting the SPSs and PPSs, provided that the different bitstreams are coordinately generated (e.g., using distinct subpicture IDs but otherwise mostly aligned SPS, PPS and PH parameters such as CTU size, chroma format, coding tools, etc.).

While subpictures and slices are independently signaled in the SPS and PPS, respectively, there are inherent reciprocal constraints between the subpicture and slice layouts in order to form a conformant bitstream. First, the presence of subpictures mandates rectangular slices and forbids raster-scan slices. Second, the slices of a given subpicture are consecutive NAL units in decoding order, which means that the subpicture layout constrains the order of coded slice NAL units within the bitstream.

Picture-in-picture services offer the ability to include a picture with a small resolution within a picture with a bigger resolution. Such a service may be beneficial to show two videos to a user at the same time, whereby the video with bigger resolution is considered as the main video and the video with a smaller resolution is considered as the supplementary video. Such a picture-in-picture service can be used to offer accessibility services where the main video is supplemented by a signage video.

VVC subpictures can be used for picture-in-picture services by using both the extraction and merging properties of VVC subpictures. For such a service, the main video is encoded using a number of subpictures. One of the subpictures is the same size as a supplementary video, which is located at the exact location where the supplementary video is intended to be composited into the main video. The supplementary video is coded independently to enable extraction. When a user chooses to view the version of the service that includes the supplementary video, the subpicture that corresponds to the picture-in-picture area of the main video is extracted from the main video bitstream, and the supplementary video bitstream is merged with the main video bitstream in its place.

Figure 5:
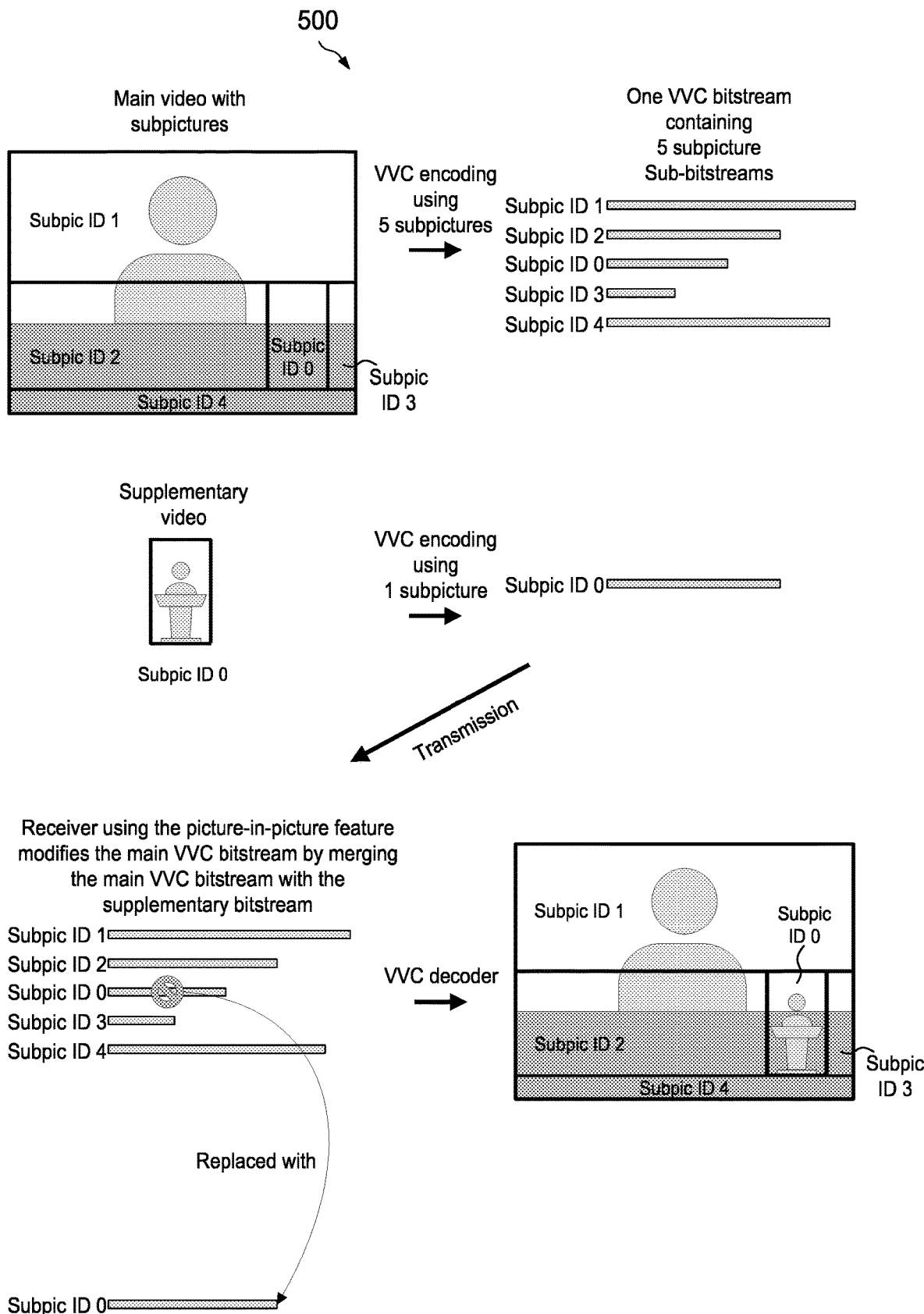
FIG. 5 is an example of picture-in-picture support based on versatile video coding (VVC) subpictures.

FIG. 5 is an example of picture-in-picture support 500 based on VVC subpictures. The portion of the main video labeled Subpic ID 0 may be referred to herein as a target picture-in-picture region since that portion of the main video will be replaced by a supplementary video with Subpic ID 0. That is, the supplementary video is embedded within or overlayed on the main video as shown in FIG. 5. In the example, the pictures of the main video and the supplementary video share the same video characteristics. In particular, the bit depth, sample aspect ratio, size, frame rate, color space and transfer characteristics, and chroma samples location for the main video and the supplementary video must be the same. The main video and supplementary video bitstreams do not need to use the same NAL unit types within each picture. However, the coding order of the pictures in the main video and supplementary video bitstreams needs to be the same.

Since merging of subpictures is used herein, the subpicture IDs used within the main video and the supplementary video cannot overlap. Even when the supplementary video bitstream is composed of only one subpicture without any further tiles or slice partitioning, subpicture information (e.g., in particular subpicture ID and subpicture ID length) needs to be signaled to enable merging of the supplementary video bitstream with the main video bitstream. The subpicture ID length used to signal the length of the subpicture ID syntax element within the slice NAL units of the supplementary video bitstream has to be the same as the subpicture ID length used to signal the subpicture IDs within the slice NAL units of the main video bitstream. In addition, in order to simplify merging of the supplementary video bitstream with the main video bitstream without the need to rewrite the PPS partitioning information, it may be beneficial to use only one slice and one tile for encoding the supplementary video within the corresponding area of the main video. The main and supplementary video bitstreams have to signal the same coding tools in the SPS, PPS, and picture headers. This includes using the same maximum and minimum allowed sizes for block partitioning, and the same value of initial Quantization Parameter as signaled in the PPS (same value of the pps_init_qp_minus26 syntax element). Coding tools usage can be modified at the slice header level.

When both main and supplementary bitstreams are available via a DASH-based delivery system, a DASH Preselection may be used to signal main and supplementary bitstreams that are intended to be merged and rendered together. A DASH Preselection defines a subset of media components of an MPD that are expected to be consumed jointly by a DASH player, wherein consuming may comprise decoding and rendering. The Adaptation Set that contains the main media component for a DASH Preselection is referred to as main Adaptation Set. In addition, each DASH Preselection may include one or multiple partial Adaptation Sets. Partial Adaptation Sets may need to be processed in combination with the main Adaptation Set. A main Adaptation Set and partial Adaptation Sets may be indicated by a preselection descriptor or by a preselection element.

Unfortunately, the following issues have been observed when attempting to support picture-in-picture services in DASH. First, while it is possible to use a DASH Preselection for the picture-in-picture experience, an indication of such a purpose is lacking.

Second, while it is possible to use VVC subpictures for the picture-in-picture experience (e.g., as discussed above), it is also possible to use other codecs and methods without being able to replace the coded video data units representing the target picture-in-picture region in the main video with the corresponding video data units of the supplementary video. Therefore, there is a need to indicate whether such replacement is possible.

Third, when the above replacement is possible, the client needs to know which coded video data units in each picture of the main video represent the target picture-in-picture region to be able to perform the replacement. Therefore, this information needs to be signaled.

Fourth, for content selection purposes (and possibly other purposes as well), it would be useful to signal the position and size of the target picture-in-picture region in the main video.

Disclosed herein are techniques that solve one or more of the aforementioned problems. For example, the present disclosure provides techniques that indicate a size and position of a target picture-in-picture region. Thus, the video coding process is improved relative to conventional video coding techniques.

The detailed embodiments below should be considered as examples to explain general concepts. These embodiments should not be interpreted in a narrow way. Furthermore, these embodiments can be combined in any manner.

In the following discussion, a video unit (a.k.a., video data unit) may be a sequence of pictures, a picture, a slice, a tile, a brick, a subpicture, a CTU/coding tree block (CTB), a CTU/CTB row, one or multiple coding units (CUs)/coding blocks (CBs), one or multiple CTUs/CTBs, one or multiple Virtual Pipeline Data Unit (VPDU), a sub-region within a picture/slice/tile/brick. A father video unit (a.k.a., a parent video unit) represents a unit larger than the video unit. Typically, a father video unit will contain several video units, for example, when the video unit is CTU, the father video unit could be a slice, CTU row, multiple CTUs, etc. In some embodiments, the video unit may be a sample/pixel. In some embodiments, the video unit may be referred to as a video data unit.

Example 1

1). To solve the first problem, an indication in signaled in the MPD. The indication indicates that the purpose of the preselection (a.k.a., Preselection, DASH Preselection, etc.) is for providing the picture-in-picture experience. That is, an indicator in the preselection element indicates that a purpose of the preselection element is for providing a picture-in-picture experience where a supplementary video appears to be overlaid on a target picture-in-picture region in a main video.

a. In one example, the indication is signaled by a particular value of the @tag attribute of the preselection (e.g., through the CommonAttributesElements). In an embodiment, the particular value of @tag is "PicInPic."

b. In one example, the indication is signaled by a particular value of the @value attribute of the Role element of the preselection. In an embodiment, the particular value of @value is "PicInPic."

Example 2

2) To solve the second problem, an indication is signaled in the MPD. The indication indicates whether the coded video data units representing the target picture-in-picture region in the main video can be replaced by the corresponding video data units of the supplementary video.

a. In one example, the indication is signaled by an attribute. In an embodiment, the attribute is designated or named @dataUnitsReplacable of the preselection.

b. In one example, the indication is specified to be optional.

i. In one example, the indication can only be present when the @tag attribute of the preselection indicates that the purpose of the preselection is for providing the picture-in-picture experience.

c. When the indication is not present, whether such replacement is possible is unknown.

d. In one example, it is specified that, when @dataUnitsReplacable is true, the client may choose to replace the coded video data units representing the target picture-in-picture region in the main video with the corresponding coded video data units of the supplementary video before sending to the video decoder. This way, separate decoding of the main video and the supplementary video can be avoided.

e. In one example, it is specified that, for a particular picture in the main video, the corresponding video data units of the supplementary video are all the coded video data units in the decoding-time-synchronized sample in the supplemental video representation.

Example 3

3) To solve the third problem, a list of region IDs is signaled in the MPD. The list of region IDs indicate which coded video data units in each picture of the main video represent the target picture-in-picture region.

a. In one example, the list of region IDs is signaled as an attribute of the preselection. In an embodiment, the attribute is named @regionIds.

b. In one example, the indication is specified to be optional.

i. In one example, the indication can only be present when the @tag attribute of the preselection indicates that the purpose of the preselection is for providing the picture-in-picture experience.

c. In one example, it is specified that the concrete semantics of the region IDs need to be explicitly specified for specific video codecs.

i. In one example, it is specified that, in the case of VVC, the region IDs are subpicture IDs, and coded video data units are VCL NAL units. The VCL NAL units representing the target picture-in-picture region in the main video are those having these subpicture IDs, which are the same as the subpicture IDs in the corresponding VCL NAL units of the supplementary video. Typically, all VCL NAL units of one picture in the supplementary video share the same subpicture ID that is explicitly signaled. In this case, there is only one region ID in the list of region IDs.

A layer is a set of VCL NAL units that all have a particular value of nuh_layer_id and the associated non-VCL NAL units. A network abstraction layer (NAL) unit is a syntax structure containing an indication of the type of data to follow and bytes containing that data in the form of a raw byte sequence payload (RBSP) interspersed as necessary with emulation prevention bytes. A video coding layer (VCL) NAL unit is a collective term for coded slice NAL units and the subset of NAL units that have reserved values of nal_unit_type that are classified as VCL NAL units in the VVC standard.

ii. In one example, it is specified that, in the case of VVC, when the client chooses to replace the coded video data units (which are VCL NAL units) representing the target picture-in-picture region in the main video with the corresponding VCL NAL units of the supplementary video before sending to the video decoder, for each subpicture ID, the VCL NAL units in the main video are replaced with the corresponding VCL NAL units having that subpicture ID in the supplementary video, without changing the order of the corresponding VCL NAL units.

Example 4

4) To solve the fourth problem, the information on the position and size of the main video is signaled in the MPD. In an embodiment, the position and size information of the main video may be used when embedding/overlaying the supplementary video, which is smaller in size than the main video.

a. In one example, the position and size information is signaled by signaling the four values x, y, width, and height. In this embodiment, x and y specify the location of the top left corner of the region, and the width and height specify the width and height of the region. The units can be in luma samples/pixels.

b. In one example, the position and size information is signaled by an attribute or element of the preselection.

c. In one example, the position and size information is signaled by an attribute or element of the Main Adaptation Set of the preselection.

d. In one example, it is specified that, when @dataUnits-Replacable is true and the position and size information is present, the position and size shall represent exactly the target picture-in-picture region in the main video.

e. In one example, it is specified that, when @dataUnits-Replacable is false and the position and size information is present, the position and size information indicates a preferable region for embedding overlaying the supplementary video (i.e., the client may choose to overlay the supplementary video in a different region of the main video).

f. In one example, it is specified that, when @dataUnits-Replacable is false and the position and size information is not present, no information or recommendation on where to overlay the supplementary video is suggested, and where to overlay the supplementary video is completely up to the client to choose.

Example 5

5 Alternatively, an element, e.g., named the Picnpic element, is added to the Preselection element. This Picnpic element contains at least one or more of the following.

a. The @dataUnitsReplacable attribute similarly as above.

b. The @regionIds attribute similarly as above.

c. The @x attribute that specifies the horizontal position of the top-left encoded video pixel (sample) of the target picture-in-picture region in the main video. The unit is video pixels (samples). The four attributes @x, @y, @width, and @height shall be either all present or all absent.

d. The @y attribute that specifies the vertical position of the top-left encoded video pixel (sample) of the target picture-in-picture region in the main video. The unit is video pixels (samples).

e. The @width attribute that specifies the width of the target picture-in-picture region in the main video. The unit is video pixels (samples).

f. The @height attribute that specifies the height of the target picture-in-picture region in the main video. The unit is video pixels (samples).

Example 6

6) Alternatively, an element, e.g., named the Picnpic element, is added to the Preselection element. This Picnpic element contains at least one or more of the following.

a. The @dataUnitsReplacable attribute similarly as above.

b. The @regionIds attribute similarly as above.

c. An element, e.g., named the Region element, that contains at least the following.

i. The @x attribute that specifies the horizontal position of the top-left encoded video pixel (sample) of the target picture-in-picture region in the main video. The unit is video pixels (samples).

ii. The @y attribute that specifies the vertical position of the top-left encoded video pixel (sample) of the target picture-in-picture region in the main video. The unit is video pixels (samples).

iii. The @width attribute that specifies the of width the target picture-in-picture region in the main video. The unit is video pixels (samples).

iv. The @height attribute that specifies the height of the target picture-in-picture region in the main video. The unit is video pixels (samples).

Below are some example embodiments corresponding to the examples discussed above. The embodiments can be applied to DASH. The most relevant parts that have been added or modified in the syntax and/or semantics below are shown in italics. There may be some other changes that are editorial in nature and thus not highlighted.

The semantics of a preselection element are provided. As an alternative to the preselection descriptor, preselections may also be defined through a preselection element as provided in Table 25. The selection of preselections is based on the contained attributes and elements in the preselection element.

TABLE 25

Semantics of Preselection element

| Element or Attribute Name | Use | Description |
|---|---|---|
| Preselection | | |
| @id | OD default = 1 | specifies the id of the Preselection. This shall be unique within one Period. |
| @preselectionComponents | M | specifies the ids of the contained Adaptation Sets or Content Components that belong to this Preselection as white space separated list in processing order. The first id defines the Main Adaptation Set. |
| @lang | O | same semantics as in Table 5 for @lang attribute. |
| @order | OD Default . . . 'undefined' | specifies the conformance rules for Representations in Adaptation Sets within the Preselection. When set to 'undefined', the Preselection follows the conformance rules for Multi-Segment Tracks in subclause 5.3.11.5.1. When set to 'time-ordered', the Preselection follows the conformance rules for Time-Ordered Segment Tracks in subclause 5.3.11.5.2. When set to 'fully-ordered', the Preselection follows the conformance rules for Fully-Ordered Segment Tracks in subclause 5.3.11.5.3. In this case, order in the @preselectionComponents attribute specifies the component order. |
| @*dataUnitsReplacable* | O | specifies whether the coded video data units representing the target picture-in-picture region in the main video can be replaced by the corresponding video data units of the supplementary video. *This attribute can only be present when the @tag attribute of this Preselection (through the CommonAttributesElements element) is equal to "PicInPic". When @tag is equal to "PicInPic" and this attribute is not present, it is unspecified whether the coded video data units representing the target picture-in-picture region in the main video can be replaced by the corresponding video data units of the supplementary video. When @tag is equal to "PicInPic" and the @dataUnitsReplacable attribute is present and equal to true, the client may choose to replace the coded video data units representing the target picture-in-picture region in the main video with the corresponding coded video data units of the supplementary video before sending to the video decoder.* |
| @*regionIds* | O | specifies the IDs of the coded video data units representing the target picture-in-picture region, as a white space separated list. *This attribute can only be present when the @tag attribute of this Preselection (through the CommonAttributesElements element) is equal to "PicInPic". The concrete semantics of the region IDs need to be explicitly specified for specific video codecs. In the case of VVC, the region IDs are subpicture IDs, and coded video data units are VCL NAL units. The VCL NAL units representing the target picture-in-picture region in the main video are those having these subpicture IDs, which are the same as the subpicture IDs in the corresponding VCL NAL units of the supplementary video (typically all VCL NAL units of one picture in the supplementary video share the same subpicture ID that is explicitly signalled, and in this case, there is only one region ID in the list of region IDs).* |
| Accessibility | 0 . . . N | specifies information about accessibility scheme. For more details, refer to subclauses 5.8.1 and 5.8.4.3. |

TABLE 25-continued

| | | Semantics of Preselection element |
|---|---|---|
| Element or Attribute Name | Use | Description |
| Role | 0 . . . N | specifies information on role annotation scheme. For more details, refer to subclauses 5.8.1 and 5.8.4.2. |
| Rating | 0 . . . N | specifies information on rating scheme. For more details, refer to subclauses 5.8.1 and 5.8.4.4. |
| Viewpoint | 0 . . . N | specifies information on viewpoint annotation scheme. For more details, refer to subclauses 5.8.1 and 5.8.4.5. |
| CommonAttributesElements | — | specifies the common attributes and elements (attributes and elements from base type RepresentationBaseType). For details, see subclause 5.3.7. |

Key
For attributes: M = mandatory, O = Optional, OD = optional with default value, CM = conditionally mandatory
For elements: <minOccurs>..<maxOccurs> (N = unbounded)
Elements are bold; attributes are non-bold and preceded with an @.

The Extensible Markup Language (XML) Syntax is provided.

```
<!-- Preselection -->
<xs:complexType name= "PreselectionType">
  <xs:complexContent>
    <xs:extension base="RepresentationBaseType">
      <xs:sequence>
        <xs:element name="Accessibility" type="DescriptorType" minOccurs="0" maxOccurs="unbounded"/>
        <xs:element name="Role" type="DescriptorType" minOccurs="0" maxOccurs="unbounded"/>
        <xs:element name="Rating" type="DescriptorType" minOccurs="0" maxOccurs="unbounded"/>
        <xs:element name="Viewpoint" type="DescriptorType" minOccurs="0" maxOccurs="unbounded"/>
      </xs:sequence>
      <xs:attribute name="id" type="StringNoWhitespaceType" default="1"/>
      <xs:attribute name="preselectionComponents" type="StringVectorType" use="required"/>
      <xs:attribute name="lang" type="xs:language"/>
      <xs:attribute name="order" type="PreselectionOrderType" default="undefined"/>
      <xs:attribute name= " dataUnitsReplacable" type="xs:boolean"/>
      <xs:attribute name= "regionIds" type="StringNoWhitespaceType"/>
    </xs:extension>
  </xs:complexContent>
</xs:complexType>
<!--Preselection Order type-->
<xs:simpleType name="PreselectionOrderType">
  <xs:restriction base="xs:string">
    <xs:enumeration value="undefined"/>
    <xs:enumeration value="time-ordered"/>
    <xs:enumeration value="fiilly-ordered"/>
  </xs:restriction>
</xs:simpleType>
```

Picture-In-Picture Based on Preselection.

When the value of the @tag attribute (through the CommonAttributesElements element) of a Preselection is equal to "PicInPic", the purpose of the Preselection is for the picture-in-picture experience. Picture-in-picture services offer the ability to include a video with a small spatial resolution within a video with a bigger spatial resolution. In this case, the different bitstreams/Representations of the main video are included in the Main Adaptation Set of the Preselection, and the different bitstreams/Representations of a supplementary video are included a Partial Adaptation Set of the Preselection.

When @tag is equal to "PicInPic" and the @dataUnitsReplacable attribute is present and equal to true, the client may choose to replace the coded video data units representing the target picture-in-picture region in the main video with the corresponding coded video data units of the supplementary video before sending to the video decoder. This way, separate decoding of the main video and the supplementary video can be avoided.

For a particular picture in the main video, the corresponding video data units of the supplementary video are all the coded video data units in the decoding-time-synchronized sample in the supplemental video Representation.

In the case of VVC, when the client chooses to replace the coded video data units (which are VCL NAL units) representing the target picture-in-picture region in the main video with the corresponding VCL NAL units of the supplementary video before sending to the video decoder, for each subpicture ID, the VCL NAL units in the main video are replaced with the corresponding VCL NAL units having that subpicture ID in the supplementary video, without changing the order of the corresponding VCL NAL units.

The semantics of a preselection element are provided in another embodiment. As an alternative to the preselection descriptor, preselections may also be defined through a preselection element as provided in Table 25. The selection of preselections is based on the contained attributes and elements in the preselection element.

TABLE 25

Semantics of Preselection element

| Element or Attribute Name | Use | Description |
|---|---|---|
| Preselection | | |
| @id | OD default = 1 | specifies the id of the Preselection. This shall be unique within one Period. |
| @preselectionComponents | M | specifies the ids of the contained Adaptation Sets or Content Components that belong to this Preselection as white space separated list in processing order. The first id defines the Main Adaptation Set. |
| @lang | O | same semantics as in Table 5 for @lang attribute. |
| @order | OD Default . . . 'undefined' | specifies the conformance rules for Representations in Adaptation Sets within the Preselection. When set to 'undefined', the Preselection follows the conformance rules for Multi-Segment Tracks in subclause 5.3.11.5.1. When set to 'time-ordered', the Preselection follows the conformance rules for Time-Ordered Segment Tracks in subclause 5.3.11.5.2. When set to 'fully-ordered', the Preselection follows the conformance rules for Fully-Ordered Segment Tracks in subclause 5.3.11.5.3. In this case, order in the @preselectionComponents attribute specifies the component order. |
| Accessibility | 0 . . . N | specifies information about accessibility scheme. For more details, refer to subclauses Error! Reference source not found. and 5.8.4.3. |
| Role | 0 . . . N | specifies information on role annotation scheme. For more details, refer to subclauses Error! Reference source not found. and 5.8.4.2. |
| Rating | 0 . . . N | specifies information on rating scheme. For more details, refer to subclauses Error! Reference source not found. and 5.8.4.4. |
| Viewpoint | 0 . . . N | specifies information on viewpoint annotation scheme. For more details, refer to subclauses Error! Reference source not found. and 5.8.4.5. |
| *Picnpic* | *0 . . . 1* | *specifies the picture-in-picture information when the purpose of the Preselection is for providing picture-in-picture experience (i.e., when the @tag attribute of the Preselection (through the CommonAttributesElements element) is equal to "PicInPic". This element shall not be present when the @tag attribute of the Preselection is not equal to "PicInPic". For more details, refer to subclause 5.3.11.6.2.* |
| *CommonAttributesElements* | — | specifies the common attributes and elements (attributes and elements from base type *RepresentationBaseType* ). For details, see subclause 5.3.7. |

Key
For attributes: M = mandatory, O = Optional, OD = optional with default value, CM = conditionally mandatory
For elements: <minOccurs>..<maxOccurs> (N = unbounded)
Elements are bold; attributes are non-bold and preceded with an @.

The XML Syntax is provided.

```
<!-- Preselection -->
<xs:complexType name="PreselectionType">
```

-continued

```
    <xs:complexContent>
        <xs:extension base="RepresentationBaseType">
            <xs:sequence>
```

-continued

```
        <xs:element name="Accessibility" type="DescriptorType"
minOccurs="0" maxOccurs="unbounded"/>
        <xs:element name="Role" type="DescriptorType" minOccurs="0"
maxOccurs="unbounded"/>
        <xs:element name="Rating" type="DescriptorType" minOccurs=
"0" maxOccurs="unbounded"/>
        <xs:element name="Viewpoint" type="DescriptorType"
minOccurs="0" maxOccurs="unbounded"/>
        <xs:element name="Picnpic" type="PicnpicType" minOccurs="0"
maxOccurs="1"/>
     </xs:sequence>
     <xs:attribute name="id" type="StringNoWhitespaceType"
        default="1"/>
     <xs:attribute name="preselectionComponents" type=
"StringVectorType" use="required"/>
     <xs:attribute name="lang" type="xs:language"/>
     <xs:attribute name="order" type="PreselectionOrderType"
default="undefined"/>
    </xs:extension>
   </xs:complexContent>
 </xs:complexType>
<!--Preselection Order type-->
<xs:simpleType name="PreselectionOrderType">
   <xs:restriction base="xs:string">
     <xs:enumeration value="undefined"/>
     <xs:enumeration value="time-ordered"/>
     <xs:enumeration value="fully-ordered"/>
   </xs:restriction>
</xs:simpleType>
```

Picture-In-Picture Based on Preselection

General

When the value of the @tag attribute (through the CommonAttributesElements element) of a Preselection is equal to "PicInPic", the purpose of the Preselection is for the picture-in-picture experience. Picture-in-picture services offer the ability to include a video with a small spatial resolution within a video with a bigger spatial resolution. In this case, the different bitstreams/Representations of the main video are included in the Main Adaptation Set of the Preselection, and the different bitstreams/Representations of a supplementary video are included a Partial Adaptation Set of the Preselection.

When @tag is equal to "PicInPic" and the @dataUnitsReplacable attribute is present and equal to true, the client may choose to replace the coded video data units representing the target picture-in-picture region in the main video with the corresponding coded video data units of the supplementary video before sending to the video decoder. This way, separate decoding of the main video and the supplementary video can be avoided.

For a particular picture in the main video, the corresponding video data units of the supplementary video are all the coded video data units in the decoding-time-synchronized sample in the supplemental video Representation.

In the case of VVC, when the client chooses to replace the coded video data units (which are VCL NAL units) representing the target picture-in-picture region in the main video with the corresponding VCL NAL units of the supplementary video before sending to the video decoder, for each subpicture ID, the VCL NAL units in the main video are replaced with the corresponding VCL NAL units having that subpicture ID in the supplementary video, without changing the order of the corresponding VCL NAL units.

Semantics of the Picnpic Element.

TABLE 27

Semantics of Picnpic element

| Element or Attribute Name | Use | Description |
|---|---|---|
| Picnpic | | |
| @dataUnitsReplacable | OD Default . . . 'false' | specifies whether the coded video data units representing the target picture-in-picture region in the main video can be replaced by the corresponding video data units of the supplementary video. When @dataUnitsReplacable is equal to 'true', the client may choose to replace the coded video data units representing the target picture-in-picture region in the main video with the corresponding coded video data units of the supplementary video before sending to the video decoder for decoding. For more details, refer to subclause 5.3.11.6.1. |
| @regionIds | O | specifies the IDs of the coded video data units representing the target picture-in-picture region, as a white space separated list. The concrete semantics of the region IDs need to be explicitly specified for specific video codecs. In the case of VVC, the region IDs are subpicture IDs, and coded video data units are VCL NAL units. The VCL NAL units representing the target picture-in-picture region in the main video are those having these subpicture IDs, which are the same as the subpicture IDs in the corresponding VCL NAL units of the supplementary video. |
| @x | O | specifies the horizontal position of the top-left encoded video pixel (sample) of the target picture-in-picture region in the main video. The unit is video pixels (samples). |

TABLE 27-continued

Semantics of Picnpic element

| Element or Attribute Name | Use | Description |
|---|---|---|
| | | The four attributes @x, @y, @width, and @height shall be either all present or all absent. |
| @y | O | specifies the vertical position of the top-left encoded video pixel (sample) of the target picture-in-picture region in the main video. The unit is video pixels (samples). |
| @width | O | specifies the width the target picture-in-picture region in the main video. The unit is video pixels (samples). |
| @height | O | specifies the height the target picture-in-picture region in the main video. The unit is video pixels (samples). |

Key
For attributes: M = mandatory, O = Optional, OD = optional with default value, CM = conditionally mandatory
For elements: <minOccurs>..<maxOccurs> (N = unbounded)
Elements are bold; attributes are non-bold and preceded with an @.

XML Syntax of the Picnpic Element.

```
<xs:complexType name="PicnpicType">
  <xs:annotation>
    <xs:documentation xml: lang="en">
    Picnpic
    </xs:documentation>
  </xs:annotation>
  <xs:attribute name="dataUnitReplacable" type="xs:boolean" default="false"/>
  <xs:attribute name="regionIds" type="StringNoWhitespaceType"/>
  <xs:attribute name="x" type="xs:unsignedInt"/>
  <xs:attribute name="y" type="xs:unsignedInt"/>
  <xs:attribute name="width" type="xs:unsignedInt"/>
  <xs:attribute name="height" type="xs:unsignedInt"/>
  <xs:anyAttribute namespace="##other" processContents="lax"/>
</xs:complexType>
```

Figure 6:
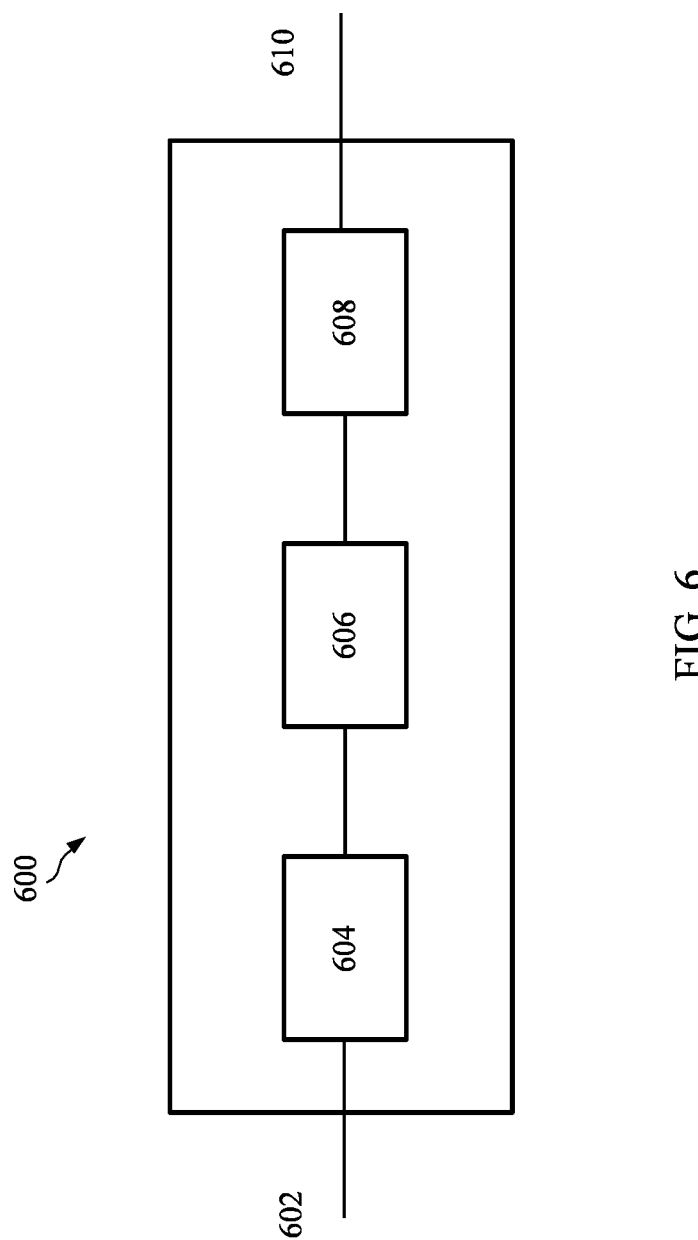
FIG. 6 is a block diagram showing an example video processing system.

FIG. 6 is a block diagram showing an example video processing system 600 in which various techniques disclosed herein may be implemented. Various implementations may include some or all of the components of the video processing system 600. The video processing system 600 may include input 602 for receiving video content. The video content may be received in a raw or uncompressed format, e.g., 8 or 10 bit multi-component pixel values, or may be in a compressed or encoded format. The input 602 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 600 may include a coding component 604 that may implement the various coding or encoding methods described in the present document. The coding component 604 may reduce the average bitrate of video from the input 602 to the output of the coding component 604 to produce a coded representation of the video. The coding techniques are therefore sometimes called video compression or video transcoding techniques. The output of the coding component 604 may be either stored, or transmitted via a communication connected, as represented by the component 606. The stored or communicated bitstream (or coded) representation of the video received at the input 602 may be used by the component 608 for generating pixel values or displayable video that is sent to a display interface 610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 7:
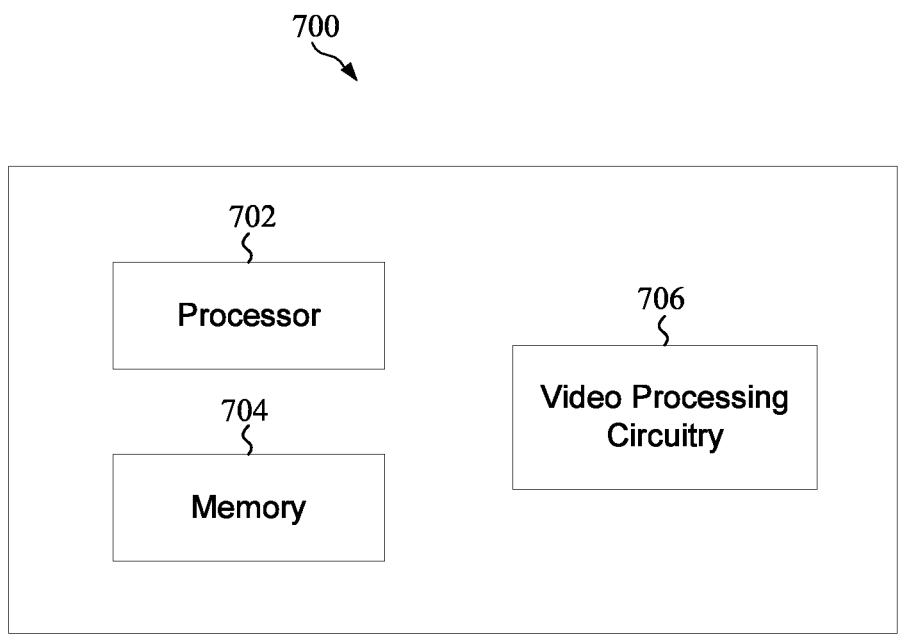
FIG. 7 is a block diagram of a video processing apparatus.

FIG. 7 is a block diagram of a video processing apparatus 700. The video processing apparatus 700 may be used to implement one or more of the methods described herein. The video processing apparatus 700 may be embodied in a smartphone, tablet, computer, Internet of Things (IoT) receiver, and so on. The video processing apparatus 700 may include one or more processors 702, one or more memories 704 and video processing hardware 706 (a.k.a., video processing circuitry). The processor(s) 702 may be configured to implement one or more methods described in the present document. The memory (memories) 704 may be used for storing data and code used for implementing the methods and techniques described herein. The video processing hardware 706 may be used to implement, in hardware circuitry, some techniques described in the present document. In some embodiments, the video processing hardware 706 may be partly or completely located within the processor 702, e.g., a graphics processor.

Figure 8:
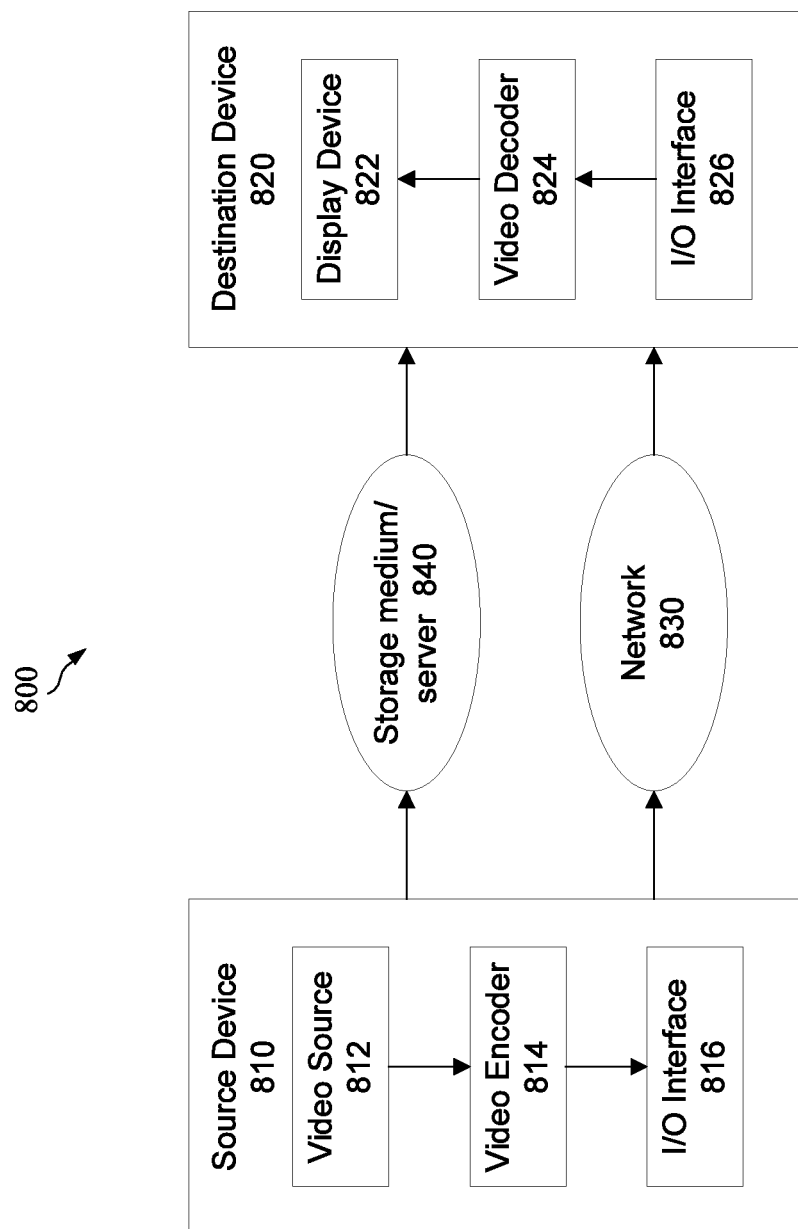
FIG. 8 is a block diagram that illustrates an example of a video coding system.

FIG. 8 is a block diagram that illustrates an example of a video coding system 800 that may utilize the techniques of this disclosure. As shown in FIG. 8, the video coding system 800 may include a source device 810 and a destination device 820. Source device 810 generates encoded video data which may be referred to as a video encoding device. Destination device 820 may decode the encoded video data generated by source device 810 which may be referred to as a video decoding device.

Source device 810 may include a video source 812, a video encoder 814, and an input/output (I/O) interface 816.

Video source 812 may include a source such as a video capture device, an interface to receive video data from a video content provider, and/or a computer graphics system for generating video data, or a combination of such sources. The video data may comprise one or more pictures. Video encoder 814 encodes the video data from video source 812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 816 may include a modulator/demodulator (modem) and/or a transmitter. The encoded video data may be transmitted directly to destination device 820 via I/O interface 816 through network 830. The encoded video data may also be stored onto a storage medium/server 840 for access by destination device 820.

Destination device 820 may include an I/O interface 826, a video decoder 824, and a display device 822.

I/O interface 826 may include a receiver and/or a modem. I/O interface 826 may acquire encoded video data from the source device 810 or the storage medium/server 840. Video decoder 824 may decode the encoded video data. Display device 822 may display the decoded video data to a user. Display device 822 may be integrated with the destination device 820, or may be external to destination device 820 which may be configured to interface with an external display device.

Video encoder 814 and video decoder 824 may operate according to a video compression standard, such as the High Efficiency Video Coding (HEVC) standard, Versatile Video Coding (VVC) standard, and other current and/or further standards.

Figure 9:
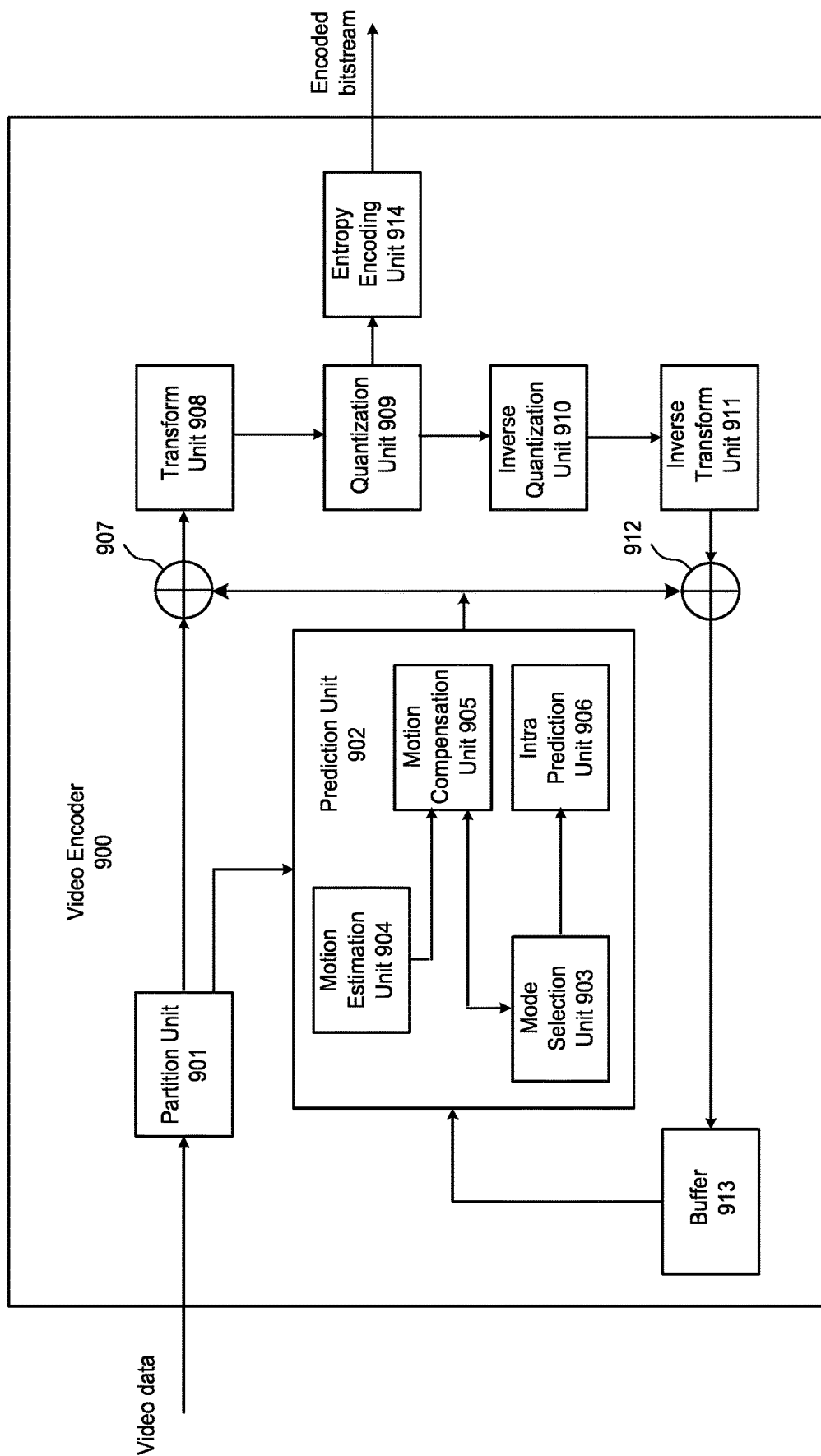
FIG. 9 is a block diagram illustrating an example of a video encoder.

FIG. 9 is a block diagram illustrating an example of a video encoder 900, which may be video encoder 814 in the video coding system 800 illustrated in FIG. 8.

Video encoder 900 may be configured to perform any or all of the techniques of this disclosure. In the example of FIG. 9, video encoder 900 includes a plurality of functional components. The techniques described in this disclosure may be shared among the various components of video encoder 900. In some examples, a processor may be configured to perform any or all of the techniques described in this disclosure.

The functional components of video encoder 900 may include a partition unit 901, a prediction unit 902 which may include a mode selection unit 903, a motion estimation unit 904, a motion compensation unit 905 and an intra prediction unit 906, a residual generation unit 907, a transform unit 908, a quantization unit 909, an inverse quantization unit 910, an inverse transform unit 911, a reconstruction unit 912, a buffer 913, and an entropy encoding unit 914.

In other examples, video encoder 900 may include more, fewer, or different functional components. In an example, prediction unit 902 may include an intra block copy (IBC) unit. The IBC unit may perform prediction in an IBC mode in which at least one reference picture is a picture where the current video block is located.

Furthermore, some components, such as motion estimation unit 904 and motion compensation unit 905 may be highly integrated, but are represented in the example of FIG. 9 separately for purposes of explanation.

Partition unit 901 may partition a picture into one or more video blocks. Video encoder 814 and video decoder 824 of FIG. 8 may support various video block sizes.

Mode selection unit 903 may select one of the coding modes, intra or inter, e.g., based on error results, and provide the resulting intra- or inter-coded block to a residual generation unit 907 to generate residual block data and to a reconstruction unit 912 to reconstruct the encoded block for use as a reference picture. In some examples, mode selection unit 903 may select a combination of intra and inter prediction (CIIP) mode in which the prediction is based on an inter prediction signal and an intra prediction signal. Mode selection unit 903 may also select a resolution for a motion vector (e.g., a sub-pixel or integer pixel precision) for the block in the case of inter-prediction.

To perform inter prediction on a current video block, motion estimation unit 904 may generate motion information for the current video block by comparing one or more reference frames from buffer 913 to the current video block. Motion compensation unit 905 may determine a predicted video block for the current video block based on the motion information and decoded samples of pictures from buffer 913 other than the picture associated with the current video block.

Motion estimation unit 904 and motion compensation unit 905 may perform different operations for a current video block, for example, depending on whether the current video block is an I slice, a P slice, or a B slice. I-slices (or I-frames) are the least compressible but don't require other video frames to decode. P-slices (or P-frames) can use data from previous frames to decompress and are more compressible than I-frames. B-slices (or B-frames) can use both previous and forward frames for data reference to get the highest amount of data compression.

In some examples, motion estimation unit 904 may perform uni-directional prediction for the current video block, and motion estimation unit 904 may search reference pictures of list 0 or list 1 for a reference video block for the current video block. Motion estimation unit 904 may then generate a reference index that indicates the reference picture in list 0 or list 1 that contains the reference video block and a motion vector that indicates a spatial displacement between the current video block and the reference video block. Motion estimation unit 904 may output the reference index, a prediction direction indicator, and the motion vector as the motion information of the current video block. Motion compensation unit 905 may generate the predicted video block of the current block based on the reference video block indicated by the motion information of the current video block.

In other examples, motion estimation unit 904 may perform bi-directional prediction for the current video block, motion estimation unit 904 may search the reference pictures in list 0 for a reference video block for the current video block and may also search the reference pictures in list 1 for another reference video block for the current video block. Motion estimation unit 904 may then generate reference indexes that indicate the reference pictures in list 0 and list 1 containing the reference video blocks and motion vectors that indicate spatial displacements between the reference video blocks and the current video block. Motion estimation unit 904 may output the reference indexes and the motion vectors of the current video block as the motion information of the current video block. Motion compensation unit 905 may generate the predicted video block of the current video block based on the reference video blocks indicated by the motion information of the current video block.

In some examples, motion estimation unit 904 may output a full set of motion information for decoding processing of a decoder.

In some examples, motion estimation unit 904 may not output a full set of motion information for the current video. Rather, motion estimation unit 904 may signal the motion information of the current video block with reference to the motion information of another video block. For example, motion estimation unit 904 may determine that the motion information of the current video block is sufficiently similar to the motion information of a neighboring video block.

In one example, motion estimation unit 904 may indicate, in a syntax structure associated with the current video block, a value that indicates to the video decoder 824 that the current video block has the same motion information as another video block.

In another example, motion estimation unit 904 may identify, in a syntax structure associated with the current video block, another video block and a motion vector difference (MVD). The motion vector difference indicates a difference between the motion vector of the current video block and the motion vector of the indicated video block. The video decoder 824 may use the motion vector of the indicated video block and the motion vector difference to determine the motion vector of the current video block.

As discussed above, video encoder 814 may predictively signal the motion vector. Two examples of predictive signaling techniques that may be implemented by video encoder 814 include advanced motion vector prediction (AMVP) and merge mode signaling.

Intra prediction unit 906 may perform intra prediction on the current video block. When intra prediction unit 906 performs intra prediction on the current video block, intra prediction unit 906 may generate prediction data for the current video block based on decoded samples of other video blocks in the same picture. The prediction data for the current video block may include a predicted video block and various syntax elements.

Residual generation unit 907 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 907 may not perform the subtracting operation.

Transform unit 908 may generate one or more transform coefficient video blocks for the current video block by applying one or more transforms to a residual video block associated with the current video block.

After transform unit 908 generates a transform coefficient video block associated with the current video block, quantization unit 909 may quantize the transform coefficient video block associated with the current video block based on one or more quantization parameter (QP) values associated with the current video block.

Inverse quantization unit 910 and inverse transform unit 911 may apply inverse quantization and inverse transforms to the transform coefficient video block, respectively, to reconstruct a residual video block from the transform coefficient video block. Reconstruction unit 912 may add the reconstructed residual video block to corresponding samples from one or more predicted video blocks generated by the prediction unit 902 to produce a reconstructed video block associated with the current block for storage in the buffer 913.

After reconstruction unit 912 reconstructs the video block, loop filtering operation may be performed to reduce video blocking artifacts in the video block.

Entropy encoding unit 914 may receive data from other functional components of the video encoder 900. When entropy encoding unit 914 receives the data, entropy encoding unit 914 may perform one or more entropy encoding operations to generate entropy encoded data and output a bitstream that includes the entropy encoded data.

Figure 10:
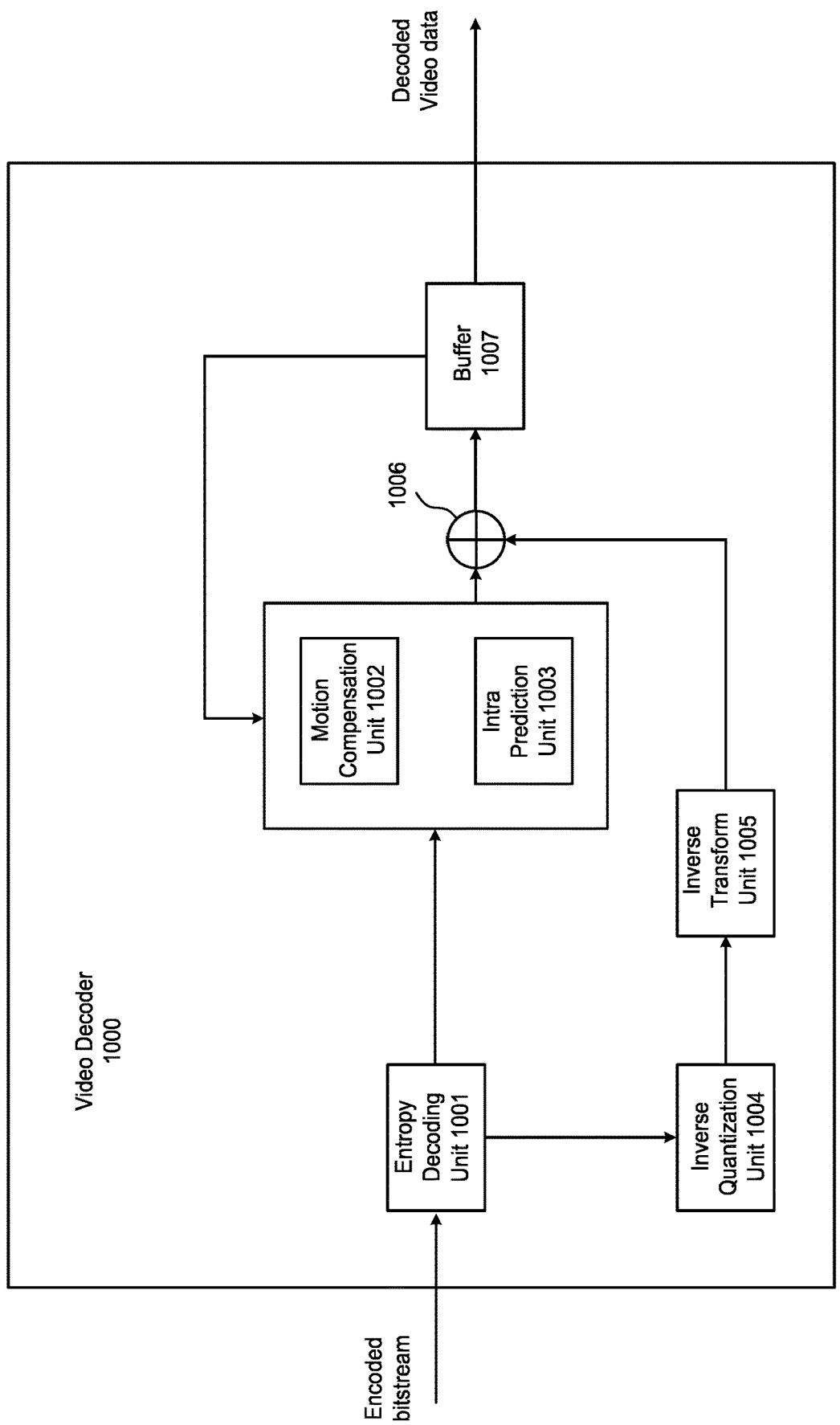
FIG. 10 is a block diagram illustrating an example of a video decoder.

FIG. 10 is a block diagram illustrating an example of a video decoder 1000, which may be video decoder 824 in the video coding system 800 illustrated in FIG. 8.

The video decoder 1000 may be configured to perform any or all of the techniques of this disclosure. In the example of FIG. 10, the video decoder 1000 includes a plurality of functional components. The techniques described in this disclosure may be shared among the various components of the video decoder 1000. In some examples, a processor may be configured to perform any or all of the techniques described in this disclosure.

In the example of FIG. 10, video decoder 1000 includes an entropy decoding unit 1001, a motion compensation unit 1002, an intra prediction unit 1003, an inverse quantization unit 1004, an inverse transformation unit 1005, a reconstruction unit 1006 and a buffer 1007. Video decoder 1000 may, in some examples, perform a decoding pass generally reciprocal to the encoding pass described with respect to video encoder 814 (FIG. 8).

Entropy decoding unit 1001 may retrieve an encoded bitstream. The encoded bitstream may include entropy coded video data (e.g., encoded blocks of video data). Entropy decoding unit 1001 may decode the entropy coded video data, and from the entropy decoded video data, motion compensation unit 1002 may determine motion information including motion vectors, motion vector precision, reference picture list indexes, and other motion information. Motion compensation unit 1002 may, for example, determine such information by performing the AMVP and merge mode signaling.

Motion compensation unit 1002 may produce motion compensated blocks, possibly performing interpolation based on interpolation filters. Identifiers for interpolation filters to be used with sub-pixel precision may be included in the syntax elements.

Motion compensation unit 1002 may use interpolation filters as used by video encoder 814 during encoding of the video block to calculate interpolated values for sub-integer pixels of a reference block. Motion compensation unit 1002 may determine the interpolation filters used by video encoder 814 according to received syntax information and use the interpolation filters to produce predictive blocks.

Motion compensation unit 1002 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1003 may use intra prediction modes for example received in the bitstream to form a prediction block from spatially adjacent blocks. Inverse quantization unit 1004 inverse quantizes, i.e., de-quantizes, the quantized video block coefficients provided in the bitstream and decoded by entropy decoding unit 1001. Inverse transform unit 1005 applies an inverse transform.

Reconstruction unit 1006 may sum the residual blocks with the corresponding prediction blocks generated by motion compensation unit 1002 or intra-prediction unit 1003 to form decoded blocks. If desired, a deblocking filter may also be applied to filter the decoded blocks in order to remove blockiness artifacts. The decoded video blocks are then stored in buffer 1007, which provides reference blocks for subsequent motion compensation/intra prediction and also produces decoded video for presentation on a display device.

Figure 11:
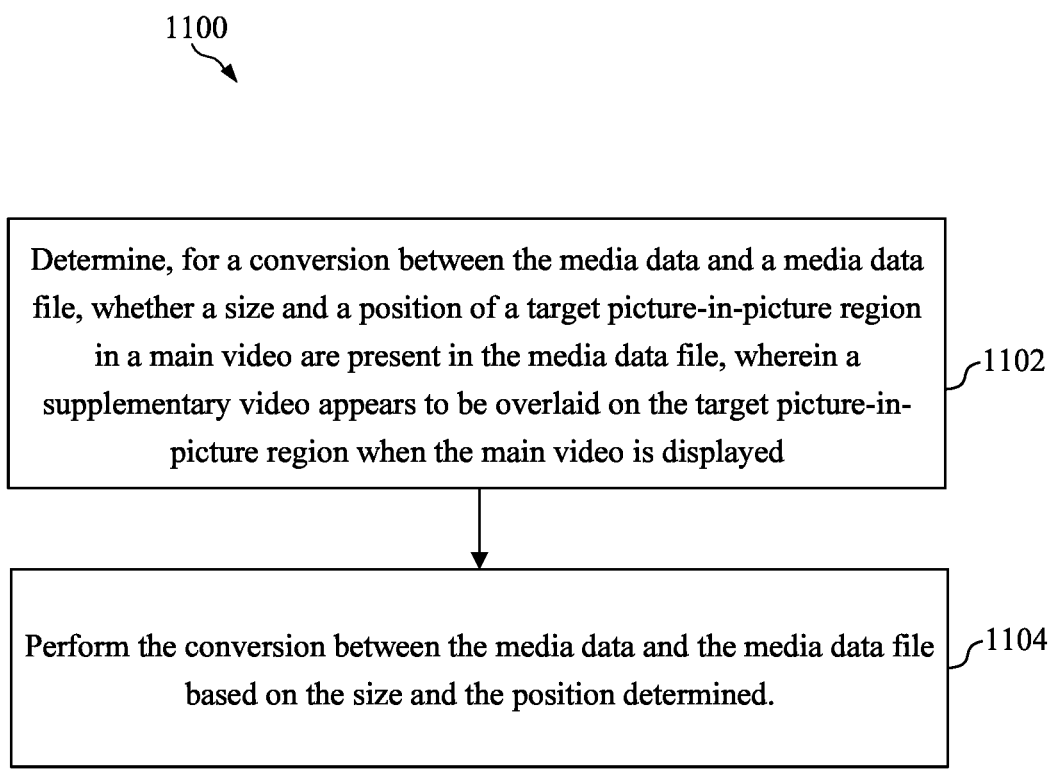
FIG. 11 is a method of processing media data according to an embodiment of the disclosure.

FIG. 11 is a method 1100 of processing media data according to an embodiment of the disclosure. The method 1100 may be performed by a coding apparatus (e.g., an encoder) having a processor and a memory. The method 1100 may be implemented when picture-in-picture services need to be indicated.

In block 1102, the coding apparatus determines, for a conversion between the media data and a media data file, whether a size and a position of a target picture-in-picture region in a main video are present in the media data file wherein a supplementary video appears to be overlaid on the target picture-in-picture region when the main video is displayed.

In block 1104, the coding apparatus perform the conversion between the media data and the media data file based on the size and the position determined. When implemented in an encoder, converting includes receiving a media file (e.g., a video unit) and encoding the media file into a bitstream. When implemented in a decoder, converting includes receiving a bitstream including the media file, and decoding the bitstream to obtain the media file.

In an embodiment, a size of the supplementary video is smaller than the size of the main video.

In an embodiment, the size and the position of the target picture-in-picture region in the main video are designated by x, y, width, and height when the size and the position are present in the media data file, where x and y specify a top-left corner of the target picture-in-picture region in luma samples, and where the width and the height specify the width and height of the target picture-in-picture region in the luma samples.

In an embodiment, one or more of the size and the position of the target picture-in-picture region in the main video is indicated by an element or an attribute of a preselection element when the size and the position are present in the media data file.

In an embodiment, one or more of the size and the position of the target picture-in-picture region in the main video is indicated by an element or an attribute of a main adaptation set of a preselection element when the size and the position are present in the media data file.

In an embodiment, the size and the position specify an exact location of the target picture-in-picture region in the main video when the size and the position are present in the media data file and when an @dataUnitsReplaceable attribute is true.

In an embodiment, the size and the position specify a suggested location of the target picture-in-picture region in the main video when the size and the position are present in the media data file and when an @dataUnitsReplaceable attribute is false.

In an embodiment, the media data file provides no recommendation for a location of the target picture-in-picture region in the main video when the size and the position are not present in the media data file and when an @dataUnitsReplaceable attribute is false.

In an embodiment, the media data file includes a preselection element that includes a Picinpic element, and wherein the Picinpic element includes all or none of an @x attribute, an @y attribute, an @width attribute, and an @height attribute.

In an embodiment, the media data file includes a preselection element that includes a Picinpic element, wherein the Picinpic element includes an @x attribute and an @y attribute, wherein the @x attribute specifies a horizontal position of a top-left encoded video sample of the target picture-in-picture region, and wherein the @y attribute specifies a vertical position of the top-left encoded video sample of the target picture-in-picture region.

In an embodiment, the media data file includes a preselection element that includes a Picinpic element, and wherein the Picinpic element includes an @width attribute and an @height attribute, wherein the @width attribute specifies a width of the target picture-in-picture region, and wherein the @height attribute specifies a height of the target picture-in-picture region.

In an embodiment, the media data file includes a preselection element that includes a Picinpic element, and wherein the Picinpic element includes a region element.

In an embodiment, the media data file includes a preselection element that includes a Picinpic element, wherein the Picinpic element includes a region element, wherein the region element includes an @x attribute and an @y attribute, wherein the @x attribute specifies a horizontal position of a top-left encoded video sample of the target picture-in-picture region, and wherein the @y attribute specifies a vertical position of the top-left encoded video sample of the target picture-in-picture region.

In an embodiment, the media data file includes a preselection element that includes a Picinpic element, wherein the Picinpic element includes a region element, wherein the region element includes an @width attribute and an @height attribute, wherein the @width attribute specifies a width of the target picture-in-picture region, and wherein the @height attribute specifies a height of the target picture-in-picture region.

In an embodiment, the size and the position are disposed in a Media Presentation Description (MPD) file. In an embodiment, the size and the position are disposed in a Dynamic Adaptive Streaming over Hypertext Transfer Protocol (DASH) preselection element.

In an embodiment, the conversion includes encoding the media data into a bitstream. In an embodiment, the conversion includes decoding the media data from a bitstream.

In an embodiment, the method 1100 may utilize or incorporate one or more of the features or processes of the other methods disclosed herein.

A listing of solutions preferred by some embodiments is provided next.

The following solutions show example embodiments of techniques discussed in the present disclosure (e.g., Example 1).

1. A method of processing video data, comprising: performing a conversion between a video data and a descriptor of the video data, wherein the descriptor conforms to a format rule, and wherein the format rule specifies that the descriptor includes a syntax element indicative of a picture-in-picture use of a Preselection syntax structure of the descriptor.

2. The method of claim 1, wherein the syntax element is a tag attribute of the Preselection syntax structure.

3. The method of claim 1, wherein the syntax element is a role attribute of the Preselection syntax structure.
4. A method of processing video data, comprising: performing a conversion between a video data and a descriptor of the video data, wherein the descriptor conforms to a format rule, and wherein the format rule specifies that the descriptor selectively includes a syntax element indicative of whether a video data units of a main video in the video data corresponding to a picture-in-picture region can be replaced with video data units of a supplementary video in the video data.
5. The method of claim 4, wherein the syntax element is an attribute field in the descriptor.
6. The method of claim 4, wherein the syntax element is selectively included based on a value of a tag attribute in the descriptor.
7. A method of processing video data, comprising: performing a conversion between a video data and a descriptor of the video data, wherein the descriptor conforms to a format rule, and wherein the format rule specifies that the descriptor includes a list of region identifiers that indicates video data units in pictures of a main video in the video data corresponding to target picture-in-picture regions.
8. The method of claim 7, wherein the list is included as an attribute of a Preselection syntax structure in the descriptor.
9. The method of any of claims 7-8, wherein the region identifiers correspond to syntax fields used for indicating the video data units according to a coding scheme used for coding the main video.
10. A method of processing video data, comprising: performing a conversion between a video data and a descriptor of the video data, wherein the descriptor conforms to a format rule, and wherein the format rule specifies that the descriptor includes one or more fields indicative a position and/or a size information of a region in a main video that is used for overlaying or embedding a supplementary video.
11. The method of claim 10, wherein the position and the size information comprises four values including a location coordinate, a height and a width of the region.
12. The method of any of claims 10-11, wherein the one or more fields comprises an attribute or an element of a Preselection syntax structure.
13. The method of any of claims 10-12, wherein whether the reason is an exact replaceable region or a preferred replaceable region is determined based on another syntax element.
14. The method of any of claims 1-13, wherein the descriptor is a Media Presentation Description (MPD).
15. The method of any of claims 1-14, wherein the format rule specifies that a specific syntax element is included in the descriptor, and wherein the specific syntax element includes picture-in-picture information.
16. The method of any of claims 1-15, wherein the conversion includes generating the bitstream from the video.
17. The method of any of claims 1-15, wherein the conversion includes generating the video from the bitstream.
18. A video decoding apparatus comprising a processor configured to implement a method recited in one or more of claims 1 to 17.
19. A video encoding apparatus comprising a processor configured to implement a method recited in one or more of claims 1 to 17.
20. A computer program product having computer code stored thereon, the code, when executed by a processor, causes the processor to implement a method recited in any of claims 1 to 17.
21. A method of video processing comprising generating a bitstream according to a method recited in any one or more of claims 1-17 and storing the bitstream on a computer readable medium.
22. A method, an apparatus, or a system described in the present document.

The following documents are incorporated by reference in their entirety:

[1] ITU-T and ISO/IEC, "High efficiency video coding", Rec. ITU-T H.265 ISO/IEC 23008-2 (in force edition).
[2] J. Chen, E. Alshina, G. J. Sullivan, J.-R. Ohm, J. Boyce, "Algorithm description of Joint Exploration Test Model 7 (JEM7)," JVET-G1001, August 2017.
[3] Rec. ITU-T H.266|ISO/IEC 23090-3, "Versatile Video Coding", 2020.
[4] B. Bross, J. Chen, S. Liu, Y.-K. Wang (editors), "Versatile Video Coding (Draft 10)," JVET-S2001.
[5] Rec. ITU-T Rec. H.274 ISO/IEC 23002-7, "Versatile Supplemental Enhancement Information Messages for Coded Video Bitstreams", 2020.
[6] J. Boyce, V. Drugeon, G. Sullivan, Y.-K. Wang (editors), "Versatile supplemental enhancement information messages for coded video bitstreams (Draft 5)," JVET-52007.
[7] ISO/IEC 14496-12: "Information technology—Coding of audio-visual objects—Part 12: ISO base media file format".
[8] ISO/IEC 23009-1: "Information technology—Dynamic adaptive streaming over HTTP (DASH)—Part 1: Media presentation description and segment formats". The 4th edition text of the DASH standard specification can be found in MPEG input document m52458.
[9] ISO/IEC 14496-15: "Information technology—Coding of audio-visual objects—Part 15: Carriage of network abstraction layer (NAL) unit structured video in the ISO base media file format".
[10] ISO/IEC 23008-12: "Information technology—High efficiency coding and media delivery in heterogeneous environments—Part 12: Image File Format".
[11] ISO/IEC JTC 1/SC 29/WG 03 output document N0035, "Potential improvements on Carriage of VVC and EVC in ISOBMFF", November 2020.
[12] ISO/IEC JTC 1/SC 29/WG 03 output document N0038, "Information technology—High efficiency coding and media delivery in heterogeneous environments—Part 12: Image File Format—Amendment 3: Support for VVC, EVC, slideshows and other improvements (CD stage)", November 2020.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing media data, comprising:
   determining, for a conversion between the media data and a media data file, whether a size and a position of a target picture-in-picture region in a main video are present in the media data file, wherein a supplementary video appears to be overlaid on the target picture-in-picture region when the main video is displayed; and
   performing the conversion between the media data and the media data file based on the size and the position determined,
   wherein the size and the position specify a suggested location of the target picture-in-picture region in the main video when the size and the position are present in the media data file and when an @dataUnitsReplaceable attribute is false.

2. The method of claim 1, wherein a size of the supplementary video is smaller than the size of the main video.

3. The method of claim 1, wherein the size and the position of the target picture-in-picture region in the main video are designated by x, y, width, and height when the size and the position are present in the media data file, where x and y specify a top-left corner of the target picture-in-picture region in luma samples, and where the width and the height specify the width and height of the target picture-in-picture region in the luma samples.

4. The method of claim 1, wherein one or more of the size and the position of the target picture-in-picture region in the main video is indicated by an element or an attribute of a preselection element when the size and the position are present in the media data file.

5. The method of claim 1, wherein one or more of the size and the position of the target picture-in-picture region in the main video is indicated by an element or an attribute of a main adaptation set of a preselection element when the size and the position are present in the media data file.

6. The method of claim 1, wherein the size and the position specify an exact location of the target picture-in-picture region in the main video when the size and the position are present in the media data file and when an @dataUnitsReplaceable attribute is true.

7. The method of claim 1, wherein the media data file provides no recommendation for a location of the target picture-in-picture region in the main video when the size and the position are not present in the media data file and when an @dataUnitsReplaceable attribute is false.

8. The method of claim 1, wherein the media data file includes a preselection element that includes a Picinpic element, and wherein the Picinpic element includes all or none of an @x attribute, an @y attribute, an @width attribute, and an @height attribute.

9. The method of claim 1, wherein the media data file includes a preselection element that includes a Picinpic element, wherein the Picinpic element includes an @x attribute and an @y attribute, wherein the @x attribute specifies a horizontal position of a top-left encoded video sample of the target picture-in-picture region, and wherein the @y attribute specifies a vertical position of the top-left encoded video sample of the target picture-in-picture region.

10. The method of claim 1, wherein the media data file includes a preselection element that includes a Picinpic element, and wherein the Picinpic element includes an @width attribute and an @height attribute, wherein the @width attribute specifies a width of the target picture-in-picture region, and wherein the @height attribute specifies a height of the target picture-in-picture region.

11. The method of claim 1, wherein the media data file includes a preselection element that includes a Picinpic element, and wherein the Picinpic element includes a region element.

12. The method of claim 1, wherein the media data file includes a preselection element that includes a Picinpic element, wherein the Picinpic element includes a region element, wherein the region element includes an @x attribute and an @y attribute, wherein the @x attribute specifies a horizontal position of a top-left encoded video sample of the target picture-in-picture region, and wherein the @y attribute specifies a vertical position of the top-left encoded video sample of the target picture-in-picture region.

13. The method of claim 1, wherein the media data file includes a preselection element that includes a Picinpic element, wherein the Picinpic element includes a region element, wherein the region element includes an @width attribute and an @height attribute, wherein the @width attribute specifies a width of the target picture-in-picture region, and wherein the @height attribute specifies a height of the target picture-in-picture region.

14. The method of claim 1, wherein the size and the position are disposed in a Media Presentation Description (MPD) file.

15. The method of claim 1, wherein the size and the position are disposed in a Dynamic Adaptive Streaming over Hypertext Transfer Protocol (DASH) preselection element.

16. The method of claim 1, wherein the conversion includes encoding the media data into a bitstream.

17. The method of claim 1, wherein the conversion includes decoding the media data from a bitstream.

18. An apparatus for processing media data comprising a processor and a non-transitory memory with instructions thereon, wherein the instructions upon execution by the processor, cause the processor to:
determine, for a conversion between the media data and a media data file, whether a size and a position of a target picture-in-picture region in a main video are present in the media data file, wherein a supplementary video appears to be overlaid on the target picture-in-picture region when the main video is displayed; and
perform the conversion between the media data and the media data file based on the size and the position determined,
wherein the size and the position specify a suggested location of the target picture-in-picture region in the main video when the size and the position are present in the media data file and when an @dataUnitsReplaceable attribute is false.

19. A method for storing a media data file, comprising:
determining whether a size and a position of a target picture-in-picture region in a main video are present in the media data file, wherein a supplementary video appears to be overlaid on the target picture-in-picture region when the main video is displayed;
generating the media data file based on the size and the position determined; and
storing the media data file in a non-transitory computer-readable recording medium,
wherein the size and the position specify a suggested location of the target picture-in-picture region in the main video when the size and the position are present in the media data file and when an @dataUnitsReplaceable attribute is false.

* * * * *